(12) United States Patent
Rachlin

(10) Patent No.: US 7,366,988 B2
(45) Date of Patent: Apr. 29, 2008

(54) METHOD AND APPARATUS FOR CONVERTING A NETWORK DESCRIPTION INTO A COMPUTER PROGRAM FOR DISAMBIGUATING TRANSMIT-BY-EXCEPTION TELEMETRY FROM A MULTI-PATH, MULTI-TIER NETWORK

(75) Inventor: Elliott H Rachlin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 903 days.

(21) Appl. No.: 10/465,411

(22) Filed: Jun. 18, 2003

(65) Prior Publication Data

US 2004/0257243 A1 Dec. 23, 2004

(51) Int. Cl.
G06F 15/177 (2006.01)
G06F 15/173 (2006.01)

(52) U.S. Cl. ............... 715/734; 709/223; 715/736; 707/3

(58) Field of Classification Search ......... 715/764, 715/794, 734; 700/706; 709/223; 707/3
See application file for complete search history.

(56) References Cited

U.S. PATENT DOCUMENTS

| | | | |
|---|---|---|---|
| 4,875,208 A | | 10/1989 | Furuhashi et al. |
| 5,115,433 A | | 5/1992 | Baran et al. |
| 5,369,784 A | * | 11/1994 | Nelson ............... 455/503 |
| 5,467,345 A | * | 11/1995 | Cutler et al. ......... 370/229 |
| 5,572,512 A | * | 11/1996 | Cutler et al. ......... 370/248 |
| 5,751,965 A | * | 5/1998 | Mayo et al. .......... 709/224 |
| 5,933,416 A | | 8/1999 | Schenkel et al. |
| 6,083,248 A | * | 7/2000 | Thompson ............ 607/30 |
| 6,271,845 B1 | | 8/2001 | Richardson |
| 6,338,011 B1 | * | 1/2002 | Furst et al. ............ 701/1 |

(Continued)

FOREIGN PATENT DOCUMENTS

EP 1211845 A2 5/2002

OTHER PUBLICATIONS

Abbott, D., et al., "Development and Evaluation of Sensor Concepts for Ageless Aerospace Vehicles," Development of concepts for an Intelligent Sensing System. NASA technical report NASA/CR-2002-211773, Langley Research Center, Hampton, Virginia, 2002.

(Continued)

*Primary Examiner*—Weilun Lo
*Assistant Examiner*—Steven B. Theriault
(74) *Attorney, Agent, or Firm*—Fogg & Powers LLC; Scott V. Lundberg

(57) ABSTRACT

A method for making an apparatus for disambiguating telemetry sent by exception over a multi-path, multi-tier communications network having a plurality of telemetry source nodes producing telemetry data elements, a plurality of linked relay nodes, and one destination node, each telemetry source node connected to at least one relay node, wherein each node originates uniquely identifiable periodically changing counter data over said network, the method comprising the steps of obtaining a network diagram of said multi-path, multi-tier communications network, organizing data describing said network diagram, wherein said data describing said network diagram includes data relating to said counter data, and autocoding said data describing said network diagram to produce a telemetry disambiguating computer program. An apparatus and a program product are also provided.

31 Claims, 21 Drawing Sheets

U.S. PATENT DOCUMENTS

| | | |
|---|---|---|
| 6,381,649 B1 | 4/2002 | Carlson |
| 6,393,432 B1* | 5/2002 | Flansburg et al. ....... 707/104.1 |
| 6,466,138 B1* | 10/2002 | Partyka ................. 340/870.11 |
| 6,487,604 B1 | 11/2002 | Rochford et al. |
| 6,632,032 B1* | 10/2003 | Dombrowski et al. ........ 398/16 |
| 6,711,137 B1 | 3/2004 | Klassen et al. |
| 6,952,396 B1 | 10/2005 | Cottreau et al. |
| 7,137,035 B2 | 11/2006 | Sato et al. |
| 2001/0028313 A1* | 10/2001 | McDonnell et al. ... 340/870.07 |
| 2002/0161751 A1 | 10/2002 | Mulgund et al. |
| 2004/0205699 A1* | 10/2004 | Keim et al. ................. 717/106 |
| 2004/0205713 A1* | 10/2004 | Keim et al. ................. 717/118 |
| 2004/0225958 A1* | 11/2004 | Halpert et al. .............. 715/513 |
| 2004/0257243 A1 | 12/2004 | Rachlin |
| 2005/0021632 A1 | 1/2005 | Rachlin |

OTHER PUBLICATIONS

International Search Report for Application No. PCT/US2004/019307, dated Nov. 18, 2004.

* cited by examiner

```
/*************************/
/*      Group Table      */
/*************************/ typedef struct {
    int FirstPath;
    int LastPath;
    char * SwitchStateName;
    int InvalidationGroupCurrentStatus;
} InvalidationGroupTableEntry;

static InvalidationGroupTableEntry InvalidationGroupTable[] = {
{1,1, "SwitchState01",0},              /* Group: 1    Box: MDM_C&C1 */
{2,2, "SwitchState02",0},              /* Group: 2    Box: MDM_C&C2 */
{3,3, "SwitchState03",0},              /* Group: 3    Box: MDM_C&C3 */
{4,6, "SwitchState09",0},              /* Group: 4    Box: MDM_INT-2 */
................................. etc ........
{359,364,"",0},                        /* Group: 51   Box: RPCM LAD42B-H */
{365,370,"",0},                        /* Group: 52   Box: RPCM LAD2B-A */
{0,0,"",-1}
};
```

312

GROUP 1 USES PATH 1 ONLY

502

GROUP 4 USES PATHS 4-6

504

```
/*************************/
/*      PATH Table       */
/*************************/ typedef struct {
    int FirstLink;
    int LastLink;
} PathTableEntry;

static PathTableEntry PathTable[] = {
{1,2},           /* Group: 1    Path: 1    */

{3,4},           /* Group: 2    Path: 2    */

{5,6},           /* Group: 3    Path: 3    */

{7,9},           /* Group: 4    Path: 4    */
{10.12},         /* Group: 4    Path: 5    */
{13,15},         /* Group: 4    Path: 6    */
................................. etc ........
{1748,1751},     /* Group: 52   Path: 368  */
{1752,1755},     /* Group: 52   Path: 369  */
{1756,1759},     /* Group: 52   Path: 370  */

```
/*************************/
/*      PIPE Table       */
/*************************/ typedef struct {
      char * IntergrationCounterPuiName;
      char * PrimarySecondaryPuiName;
      int PrimaryEnumeration;
      int PipeStatus;
} PipeTableEntry;

static PipeTableEntry PipeTable[] = {
{"GndIntegICtr","",1,0},
```

802  804  806  808

```
{"LADP01MDZZ01U1","LADP01MDAVNJJ",0,0},
{"LADP01MDZZ01U2","LADP01MDAVNSJ",0,0},
{"LADP01MDZZ01U3","LADP01MDAV01J",0,0},
{"LADP08MD4353J2","LADP01MDAW1SJ",1,0},
............................ etc ........
{"LAPR16FC0617U","",1,0},
{"LAPR13FC0617U","",1,0},
{"","",0}
};
```

FIG. 8

METHOD AND APPARATUS FOR CONVERTING A NETWORK DESCRIPTION INTO A COMPUTER PROGRAM FOR DISAMBIGUATING TRANSMIT-BY-EXCEPTION TELEMETRY FROM A MULTI-PATH, MULTI-TIER NETWORK

FIELD OF THE INVENTION

The present invention generally relates to telemetry data processing, and more particularly relates to a method and an apparatus for creating and updating an apparatus for disambiguating, at high average temporal resolution, transmit-by-exception telemetry sent over a multi-path, multi-nodal network.

BACKGROUND OF THE INVENTION

Some aerospace systems, such as the International Space Station (ISS) and the Space Transportation System (STS), or Space Shuttle, produce large volumes of telemetry which must be transmitted to terrestrial stations for use by mission controllers and vehicle health managers, among others. The transmission occurs over multi-nodal, multi-tiered networks which include nodes within and exterior to the space vehicles. Because bandwidth for transmitting the telemetry data is limited, various approaches to bandwidth compression have been attempted, one of which is the transmit-by-exception approach.

In a transmit-by-exception telemetry data transfer, the only data transmitted are those telemetry values which have undergone a significant change since they were last transmitted. This approach can provide substantial bandwidth compression. A resulting difficulty, however, is that the user on the ground cannot tell the difference between data that is not changing because it has not required transmission and data that is not changing because some portion of the network is malfunctioning. Network anomalies may be intermittent, making some telemetry faulty and leaving some telemetry valid. Unchanging data is ambiguous at the point of reception as to the cause for the lack of change.

The problem is exacerbated when the telemetry data is to be used in Integrated Vehicle Health Management (IVHM) systems. IVHMs assess telemetry data using diagnostic and prognostic software to support vehicle health maintenance. Experience has shown that ambiguous telemetry data may cause known IVHM algorithms to produce erroneous results.

One approach is to observe a constantly-changing telemetry data element, or counter, transmitted from the same source node as the transmit-by-exception data to be disambiguated, or target data. The target data may be evaluated as valid if the frequently-changing telemetry data element is seen to change over the time period when the target data was sent. The approach has several weaknesses. First, in a multi-path, multi-tiered communications network signal noise can cause false data values in the counter data, leading an algorithm to conclude that the counter is operating when, in fact, it is not operating. Thus, target data that is invalid may be erroneously seen as valid.

Second, counters that change at different rates on different nodes are utilized. The temporal resolution of a pairing disambiguation scheme for an individual node is the period of that node's counter minus the pulse width of the data bit. The temporal resolution of the disambiguation scheme for the network as a whole is the resolution of the slowest counter in the network. The temporal resolution for the network as a whole matters because IVHM systems need a series of complete "snapshots" of the vehicle system that give, as closely as possible, the state of the vehicle at particular times. If some of the data has gone bad without notice, the snapshots will be flawed and the IVHM system will reach an erroneous conclusion.

Designers and operators of large networks such as those used with ISS and STS often use their own commercial-off-the-shelf (COTS) equipment. Counters of different frequencies are inevitable, and the counter for a particular node may be the most reliably changing telemetry data element rather than the fastest-changing element. Also, the most rapidly updating piece of telemetry from one node may still be slower than the slowest telemetry from another node. Ideally, each node might be equipped with a high-speed clock, but this would quickly recreate the bandwidth-saturation problem that transmit-by-exception telemetry was designed to solve. Likewise, retrofitting each network node with a dedicated counter would be impractical. If one counter in the network operates at 0.1 Hz, it could be nearly 10 seconds before a problem was noticed. Disambiguation schemes with low temporal resolutions are problematic in IVHM systems, so the pairing approach is rejected.

Networks are reconfigurable by nature, making the process of tracking network health an expensive and energetic undertaking. For example, whenever a new module is added to the ISS, at least one sub-net must be added to the network and new telemetry points must be added. The same may be true for additions, such as a robotic arm, incorporated into an STS.

Accordingly, it is desirable to have a user-friendly method of providing telemetry disambiguation of transmit-by-exception telemetry which is easily adaptable to changes in the network and to changes in the set of telemetry data elements sent over the network. It is therefore further desirable that the user-friendly method be adapted for creating an apparatus for disambiguating telemetry. Avoiding physical upgrades to existing network equipment while creating the desirable features just mentioned is also desirable. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method for making an apparatus for disambiguating telemetry sent by exception over a multi-path, multi-tier communications network having a plurality of telemetry source nodes producing telemetry data elements, a plurality of linked relay nodes, and one destination node, each telemetry source node connected to at least one relay node, wherein each node originates uniquely identifiable periodically changing counter data over said network, the method comprising the steps of obtaining a network diagram of said multi path, multi-tier communications network, organizing data describing said network diagram, wherein said data describing said network diagram includes data relating to said counter data, and autocoding said data describing said network diagram to produce a telemetry disambiguating computer program.

An apparatus is disclosed for disambiguating telemetry transmitted by exception over a multi-path, multi-tier, multi-node network to a destination node, the apparatus comprising a processor, a memory coupled to said processor, code in said memory executable to translate data representing a network into a data structure retaining data representing designed paths through said network associated with status indicators for each node in each said designed path; and code in said memory executable to produce in said memory code for searching said data structure to find at least one possible path among said designed paths.

BRIEF DESCRIPTION OF THE DRAWINGS

The present invention will hereinafter be described in conjunction with the following drawing figures, wherein like numerals denote like elements.

FIG. 5 illustrates details of the exemplary group table in relation to an exemplary path table;

FIG. 8 illustrates details of the data structure of an exemplary pipe table;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
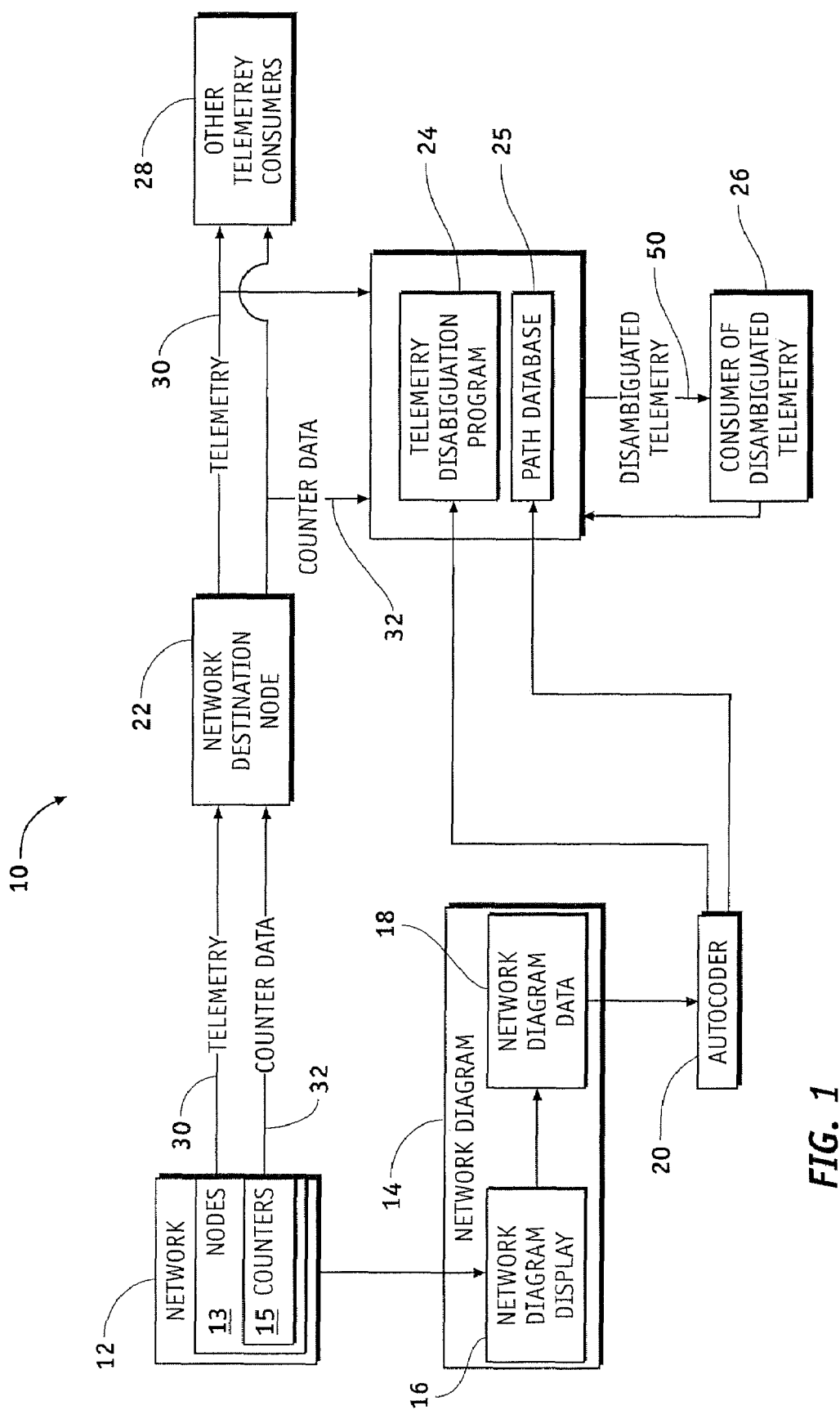
FIG. 1 illustrates a diagram of an exemplary apparatus for disambiguating telemetry.

Referring to FIG. 1, the apparatus for disambiguating telemetry 10 comprises a telemetry disambiguating computer program 24 which is autocoded (see 20) from a computer-generated network diagram 14 and which is responsive to counter data 32 from the diagrammed network 12 to disambiguate telemetry data 30. The apparatus 10 may include the counters (see 1208, FIG. 9) in the network nodes 110, 142, and other trapezoids and rectangles in FIG. 2 which each produce one data stream of counter data 32. In most embodiments, counter data 32 is an existing telemetry data 30 element selected for the periodic nature of the data produced. However, in a few embodiments, such counters may be dedicated. The apparatus 10 further includes a computer 1250 (FIG. 12) used to generate the network diagram 14. The computer-generated network diagram 14 may be drawn using drafting software. For example, the diagram may be drawn using VISIO software from Microsoft Corporation. In an alternate embodiment, data may be read from a file by software responsive to the data to draw the network diagram 14. For example, a VISIO graphic data file may be directly written, or written with the aid of a separate user interface, and then read with VISIO to produce the diagram. Other methods of obtaining a computerized network diagram are also contemplated, such as scanning a conventionally drawn diagram and using optical character recognition and pattern recognition software to convert the drawing to data.

The network diagram 14 may comprise a network diagram display 16 and network diagram data 18. Network diagram data 18 relates to the drafted diagram on the display 16. Autocoder 20 is responsive to network diagram data 18 to reorganize the data and produce network diagram data structures 25 and telemetry disambiguating program 24, which uses network diagram data structures 25.

The apparatus 10 may be disposed in streams of telemetry data 30 and counter data 32 from a network ground node 22 to a particular consumer 26 of disambiguated telemetry. In an alternate embodiment, the apparatus 10 may be interposed between a network ground node 22 and a telemetry distribution node (not shown) to provide disambiguated telemetry 50 to all telemetry consumers 26 and 28.

Figure 2:
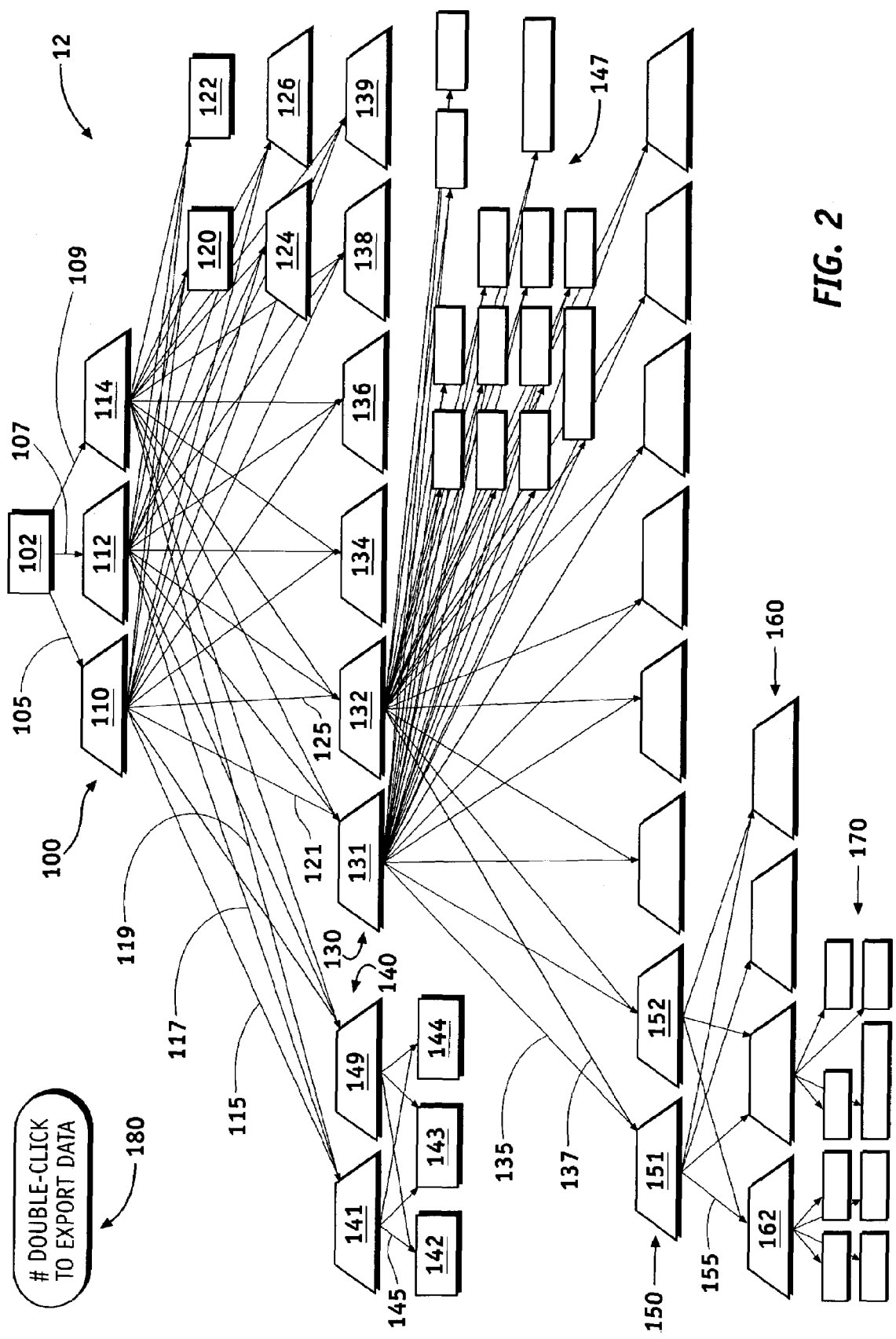
FIG. 2 illustrates portions of an exemplary network diagram display.

Referring also to FIG. 1, FIG. 2 shows an exemplary network diagram display 16 of network diagram 14 representing an exemplary network 12 over which telemetry data is sent by exception. The network diagram display 16 comprises relay node icons (e.g. 110, 112, 114, 124, 126, 131, 132, 134, 136, 138, 139, 141, 149, 151, 152, and 162 having a first shape exemplified by a trapezoid, telemetry source node icons (e.g. 120, 122, 142, 143, 144, all of 170, and all of 147) having a second shape exemplified by a rectangle, and link icons (e.g. 105, 107, 109, 115, 117, 119, 135, 137, 145, 155 and many unlabeled) having a third shape exemplified as arrows.

Representative relay node 131 may be capable of multiple functions. Relay node 131 may receive telemetry data 30 from other relay nodes, such as 151 and 152, and transmit what it received to a node 110, 112, or 114 in a higher tier 100. Relay node 131 can receive telemetry data 30 and counter data 32 from telemetry source nodes 147 and transmit that telemetry data 30 and counter data 32 to a node 110, 112, or 114 in a higher tier 100. Relay node 131 may generate telemetry data 30 inside itself and send that data to the destination node 102. Relay node 131 may also generate counter data 32, which is a stream of constantly changing data. A data stream is considered "constantly changing" if it changes periodically. Preferably, counter data 32 changes at least as often as the corresponding telemetry data 30 may be sent from a common originating node 131.

Telemetry source nodes 120, 122,142-144, 147, and 170 are sources of telemetry data 30 and also sources of counter data 32. Telemetry source nodes 120, 122,142-144, 147, and 170 do not perform relay functions. Telemetry source nodes 120, 122,142-144, 147, and 170 are linked to at least one relay node (e.g. 131). Each link (e.g., 145) connects exactly two nodes (e.g. 141 and 142) and each link may be uniquely identified. A preferred method for link identification is by ordered source node and destination node pairs. For example, a unique identifier for link 145 would be {142, 141}. The link icon in the embodiment shown in FIG. 2 is an arrow pointing to a data source. In other embodiments, the arrows may point the other way or other icons may be used. The particular icons used to represent relay nodes, telemetry source nodes and links are not important, as long as they are distinct from one another. Link icons should have at least two distinct ends.

The display 16 represents a multi-path, multi-tiered network 12 (FIG. 1). The network is multi-path because there may be more than one way to get from a given node to destination node 102. For example, data may move from any of telemetry source nodes 147 through either of relay nodes 131 and 132, and through any of relay nodes 110, 112, and 114 to destination node 102. Network 12 is considered "multi-tiered" because it has multiple layers, or tiers 100, 130, 140, 150, and 160. The first, highest, tier comprises all nodes directly connected to the destination node 102. The next, lower, tier comprises all nodes directly connected to first tier nodes, etc.

The tiers may correspond to physical relationships of node-bearing components in the network 12. Network 12 may have sub-networks added to it from time to time. For example, the addition of a new module to the ISS brings with it a subnet of telemetry source nodes, links, and relay nodes which must be integrated into the preexisting network 12. Tier 140 is suggestive of an added subnet.

The network diagram display 16 may further comprise an interactive icon 180 used to initiate data export, including autocoder 20 initiation.

Figure 3:
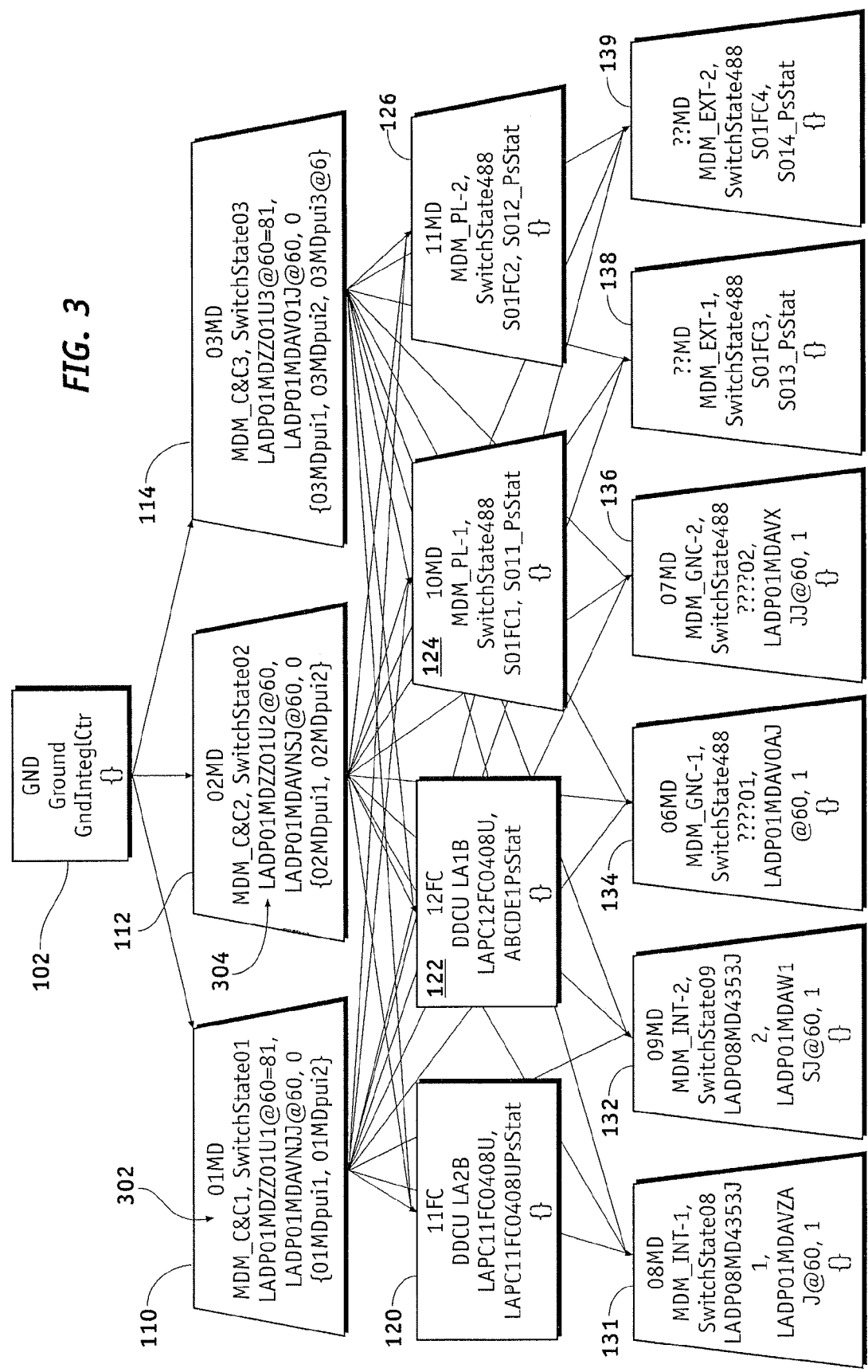
FIG. 3 illustrates details of a section of an exemplary network diagram display, with associated data.

Referring also to FIGS. 1 and 2, FIG. 3 shows a detailed view of a section 200 of the network diagram 14. Each nodal icon has text associated with it, which could not be shown in FIG. 2, but which is common to all nodal icons. The text relates to the node corresponding to the nodal icon, the network diagram 14, and the data 30 and 32 transferred over the network 12 from the corresponding node. Data regarding the structure of the network 12 is contained in the shape of the icons and their connections to one another. The data relating to the structure of the network and the data relating to the data transmitted over the network together comprise the network diagram data 18. The auto coder 20 will use this network diagram data 18 to auto code the telemetry-disambiguating program 24. An autocoder 20 may process network diagram data by identifying each of the icons by shape (see 1307, FIG. 13).

Figure 9:
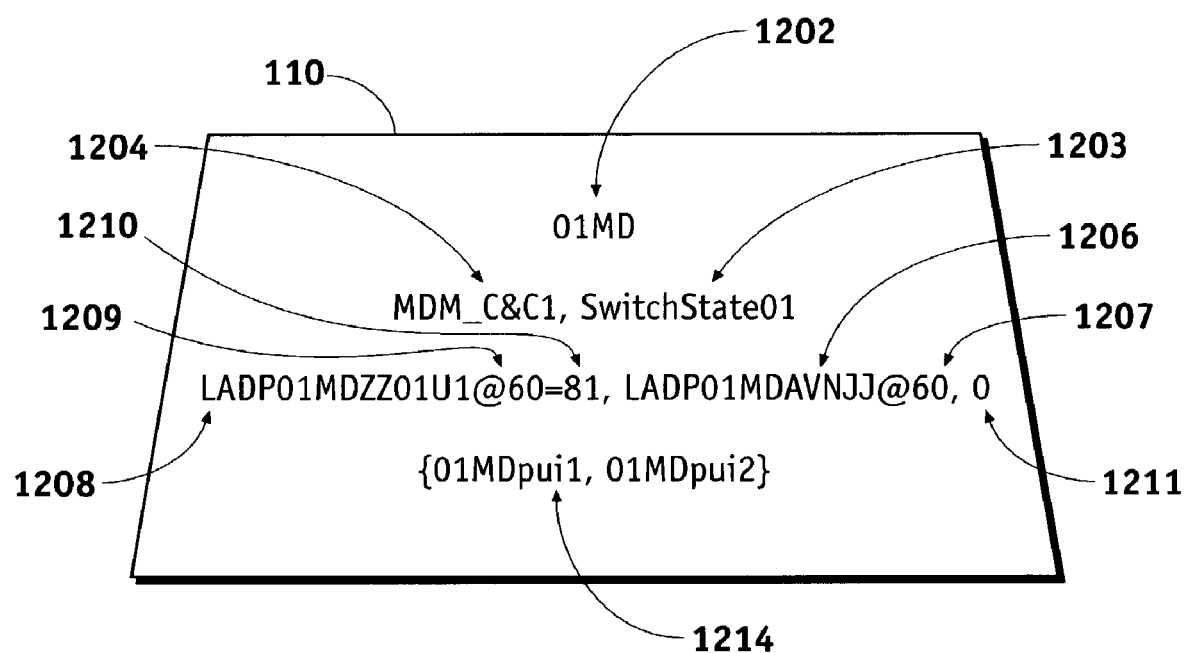
FIG. 9 illustrates details of a relay node icon of an exemplary network diagram display, with associated data.

Referring additionally to FIG. 9, the first text string associated with icon 110, "01MD" represents a unique icon identifier 1202, used to differentiate relay node 110 and its associated icon from all other relay nodes and their icons. Text string 1204 relates to a name for the node 110. "MDM$_{C\&C}$1" for example, is the box name for a "Multiplexer-DeMultiplexer_Command and Control 1" relay node 110. The switch state variable name 1203 is an example of text string data which may be included, although not directly related to telemetry disambiguation. The network data structures 25 may have a variety of uses in network analysis and additional data may be associated with icons to serve the additional uses. In this example, switch state variable names 1203 have a one-to-one correspondence with relay nodes, permitting node status to be quickly searched by any telemetry consumer having the switch state name 1203 of the node. Text string 1208 shows a variable name "LADP01MDZZ01U1" for the counter uniquely associated with relay node 110. For simplicity, the counter name used may be the same as the telemetry variable name used in other processing of the telemetry. In an alternate embodiment, the variable names may be unique within the telemetry disambiguation software and a translation to external names may be added. The frequency of counter LADP01MDZZ01U1 is made explicit by a text substring 1209 which designates an update frequency of the counter data 32. For example, text string 1209, "@60", indicates the counter changes 60 times per minute. The format indicator for counter data 32 from counter LADP01MDZZ01U1 may be designated by a text substring 1210 as, for example, "=81." Default values for frequency and format may be set and relied upon.

Another specialized telemetry data element associated with data flow control is named "LADP01MDAVNJJ" in text string 1206. LADP01MDAVNJJ is the primary/secondary process unique identifier (PUI) for node 110. The primary/secondary PUI contains a value indicating whether node 110 is in a primary or secondary mode. The primary/secondary status indicator may operate as an on/off switch for the node 110. In primary status, the node 110 sends and relays data to the destination node 102. In secondary status, the node 110 does not send or relay data to the destination node 102. The primary/secondary PUI text string 1206 contains an update rate substring 1207. Not all relay nodes have primary/secondary PUIs. Those relay nodes which do have primary/secondary PUIs may also have a primary enumeration code 1211. Primary enumeration code 1211 contains the value which the associated primary/secondary PUI uses to indicate primary mode. This is required in a heterogeneous network where nodes manufactured by different entities use different primary/secondary PUI values to indicate primary status.

The present invention allows additional data to be associated with each nodal icon for any purpose. Given the autocoder 20 function of finding all paths in the network 12 and storing the paths in network data structures 25, other network analysis uses based upon other data associated with network diagram icons may be readily developed. List 1214 of telemetry data elements 01MDpui1 and 01MDpui2 identifies telemetry data elements which may not be associated with data flow control and which originate from the relay node 110 itself.

A unique identifier is a unique name, and a PUI is a name for a data element or stream having a name associated with it. PUI may encompass more named data streams than a strict interpretation of "telemetry" might support, such as data regarding experimental packages onboard the vehicle. Hereinafter, "PUI", "telemetry data element name", "data element name", and "data name" all refer to unique identifiers of data streams being sent over the network. "PUI" is also used to refer to both the name of data and the named data.

Telemetry data source nodes 120 and 122 also have text strings associated with their respective icons. Each telemetry data source node icon has a counter name ending in "U" and a status indicator ending in "Stat." In an alternate embodiment, link icons may have text strings. With all nodes, the autocoder 20 will associate the text strings such as 1202 and 1208 with the icon-derived data. Text strings such as 1202 and 1208 will become data stored in the network data structures 25.

The autocoder 20 produces network data structures 25 and telemetry disambiguating program 24. Telemetry disambiguating program 24 may be produced by simply printing the predetermined text of it to a file. That is, the division of functionality between telemetry disambiguating program 24 and network diagram data structures 25 are preferably such that only the data structures 25 change when the structure or status of the network 12 changes. Telemetry disambiguating program 24 may be responsive to an input of a specific telemetry data element name to search for all paths from the telemetry data source node where the named telemetry data element originates to the destination node 102. Each path comprises an ordered sequence of linked nodes. The program 24 checks the counter data of each node of each possible path to find if there is any path having all nodes in an operating status. The program 24 may stop searching when it finds a first good path. If one path exists in which all nodes are operating, the input telemetry data element is known to be good-but-unchanging, and so is no longer ambiguous. The program 24 accesses the network data structures 25 in searching each possible path. The network data structures contain data describing all possible paths from each node to the destination node 102.

Figure 10:
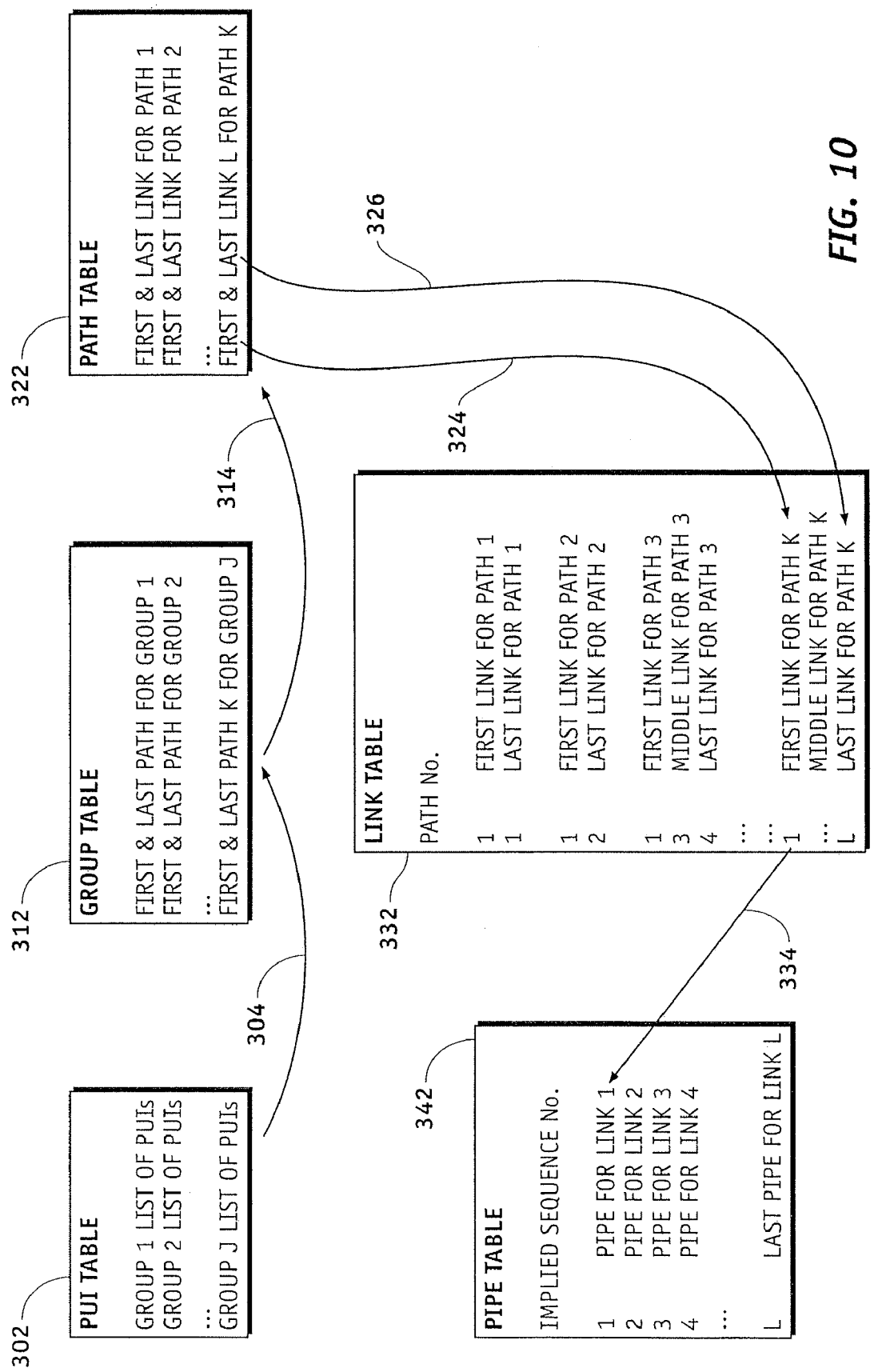
FIG. 10 illustrates an exemplary data structure for disambiguating telemetry.

FIG. 10 shows a diagrammatic overview of exemplary tables 302, 312, 322, 332, and 342 comprising exemplary network data structures 25. Table 302 comprises a set of data lists for each node. Each data list has one PUI, associated data, and a group index. The sum of all PUIs for a particular node may be referred to as a "group." Each node preceding the destination node 102 is represented in the PUI table 302. PUI table 302 associates PUIs with group indexes and, therefore, nodes.

Group table 312 associates a pair of paths with each group. The pair of paths is represented as a first path index and a last path index referenced to lists of paths for each group in path table 332. When telemetry disambiguation program 24 receives a PUI name such as 1206 or 1208, program 24 finds the PUI name in PUI table 302 and thereby finds its group index. Telemetry disambiguation program 24 then associates 304 the group index with a data list at the group-indexed slot in the group table 312.

Figure 4:
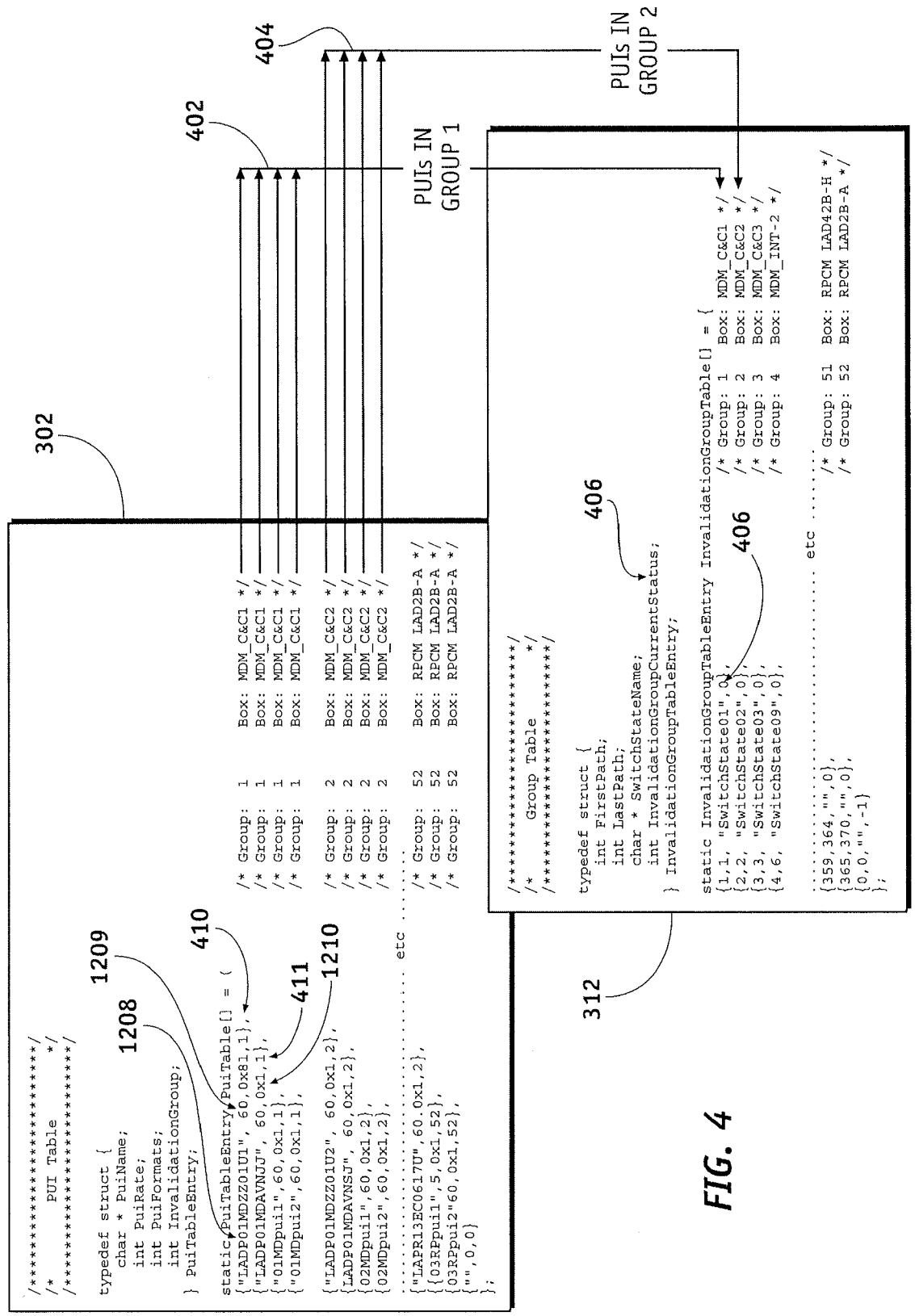
FIG. 4 illustrates details of an exemplary PUI table in relation to an exemplary group table.

FIG. 4 shows a detailed exemplary PUI table 302 and its relationship to group table 312. The tables in FIG. 4 are shown coded in the C programming language, wherein each table 302 and 312 is a structure-type variable containing data lists, shown in curly brackets. A structure-type variable may be indexed so that individual lists can be accessed by their ordinal position in the variable. Other programming languages may be also be used. PUI data 410 in PUI table 302 comprises a data list in structure-type variable, the data list formed by autocoder 20 by parsing text strings 1208, 1209, and 1210 (FIG. 10) and adding a group index, for example: "InvalidationGroup." Other PUIs in PUI table 302 are constructed in the same way. Group table 312 comprises an ordered sequence of one data list 406 in a structure-type variable for each group. The data entries in each list 406 comprises a first path index, a last path index, a switch state variable name parsed from a text string 1203 (FIG. 9) associated with a nodal icon 110 in the network diagram 14, and a group status indicator. The PUIs for each group are associated 304 with the appropriate entry in group table 312 via the group index "InvalidationGroup" in each PUI list used to index the structure-type variable that is group table 312. For example, group 1 PUIs 402 in PUI table 302 are each associated 304 (FIG. 1) with the group 1 data entry in table 312 via the node index "InvalidationGroup," used to index the structure-type variable that is group table 312. For further example, group 2 PUIs 404 in PUI table 302 are likewise associated 304 (FIG. 10) with the group 2 data entry in table 312 via the group index "InvalidationGroup" used to index the structure-type variable that is group table 312.

Referring to FIG. 10, path table 322 comprises a structure-type variable containing one list for each path, wherein the lists are structured in sequences by path and by group. The first and last path indexes in a group table 312 entry may be used to find in the path table 322 all paths indexed within the range of paths between the first and last path indexes. Thus, data relating to all paths of PUIs originating in any particular node may be found in the path table 322.

FIG. 5 shows details of the path table 322 and its relationship with group table 312. The autocoder 20 creates the relationship between the group sequence and the path sequence. Each data list in path table 322 comprises a first link and a last link, each represented by an index to the link table 332. The first path and last path indexes of each group table 312 list provide access to each path in the path table 322 associated with each group. For example, group 1 uses only one path 504, indexed as "1" for first and last paths, path 1 associated 314 with the first ordinal position in the structure-type variable that is the path table 322. For further example, group 4 uses three paths 502, indexed as 4-6 for first through last paths 502, associated 314 (FIG. 3) with the fourth through sixth ordinal positions in the structure-type variable that is the path table 322.

Referring to FIG. 10, link table 332 comprises ordered sequences of data lists each having a single pipe index for accessing data from the pipe table 342. Each path has the required number of links to form a path from the originating node to the destination node. The first link index for a particular path in path table 322 associates 324 with a first link data list for the particular path in the link table 332 and to each successive link data list up to the link data list associated 326 with the last link index from the path table 322.

Figure 6:
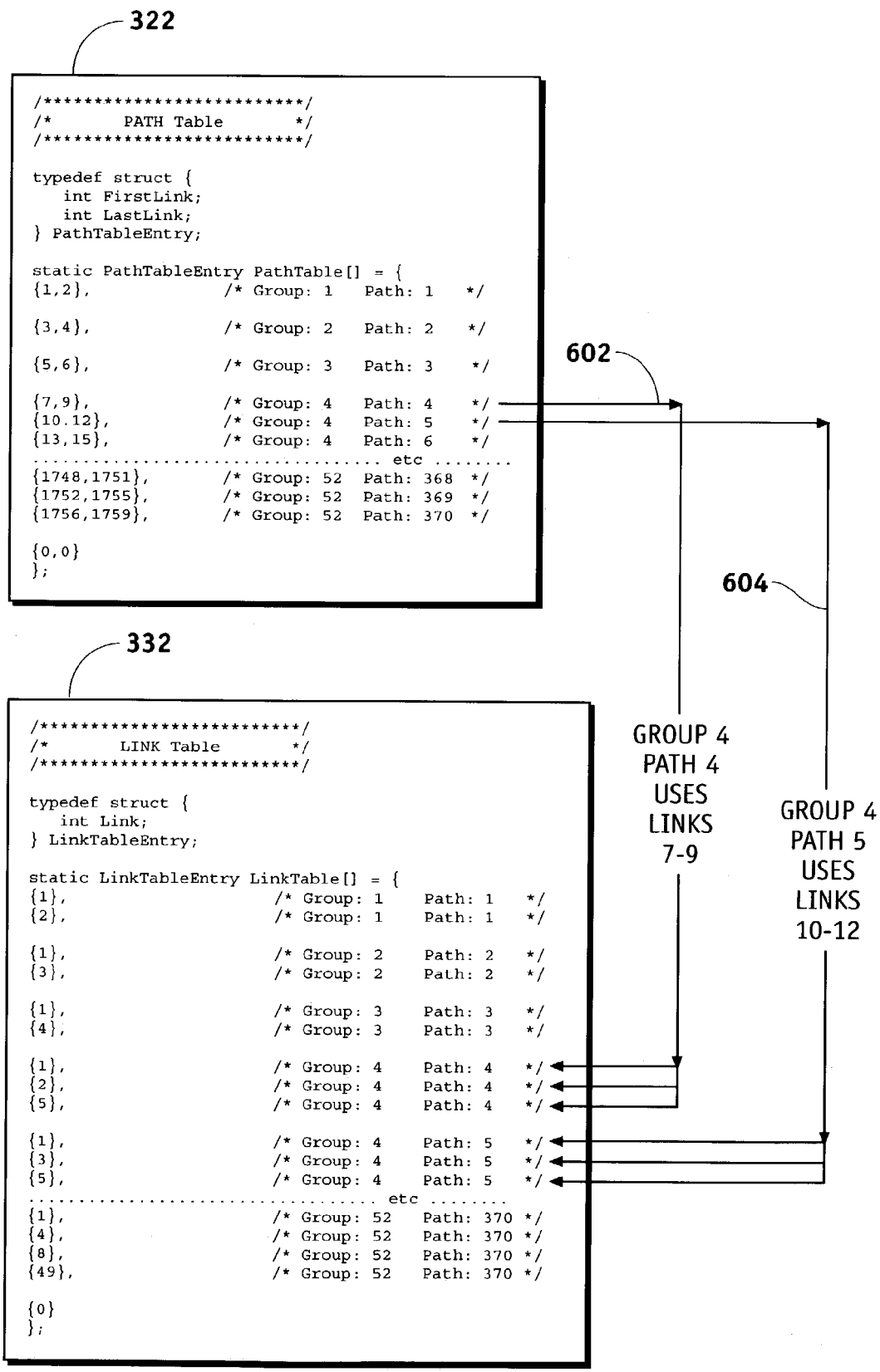
FIG. 6 illustrates details of the exemplary path table in relation to an exemplary link table.

FIG. 6 shows details of the link table 332 and its relationship with group table 322. Link table 332 comprises a structure-type variable containing one list for each link, wherein the lists are structured in sequences by group and by path. Each list comprises a single link represented by an index to pipe table 342. The first link and last link indexes of each path table 322 list provide access to each ordered link sequence in the link table 332. For example, path four 602 of group four listed in path table 322 associates 324 (FIG. 3) first link index "7" with a link in the seventh slot in link table 332. Path four 602 of group four listed in path table 322 associates 326 (FIG. 10) last link index "9" with a link in the ninth slot in link table 332. The ordinal sequence of links 7-9 can thereby be accessed, providing an ordered sequence of pipe table 342 (FIG. 10) indexes {1}-{2}-{5} indicating which physical connections, or pipes, in the network comprise path four 602. By similar exemplary associations 324 and 326 (FIG. 10), the pipe table indexes {1}-{3}-{5} may be obtained for path five 604.

Referring to FIG. 10, pipe table comprises ordered data lists each comprising a counter name and an indicator of node operability, or node status indicator. The pipe table holds one data list for each link. Each link in the link table 332 associates 334 a pipe in the pipe table 342. Each pipe table data list contains data regarding the physical attributes of each link.

Figure 7:
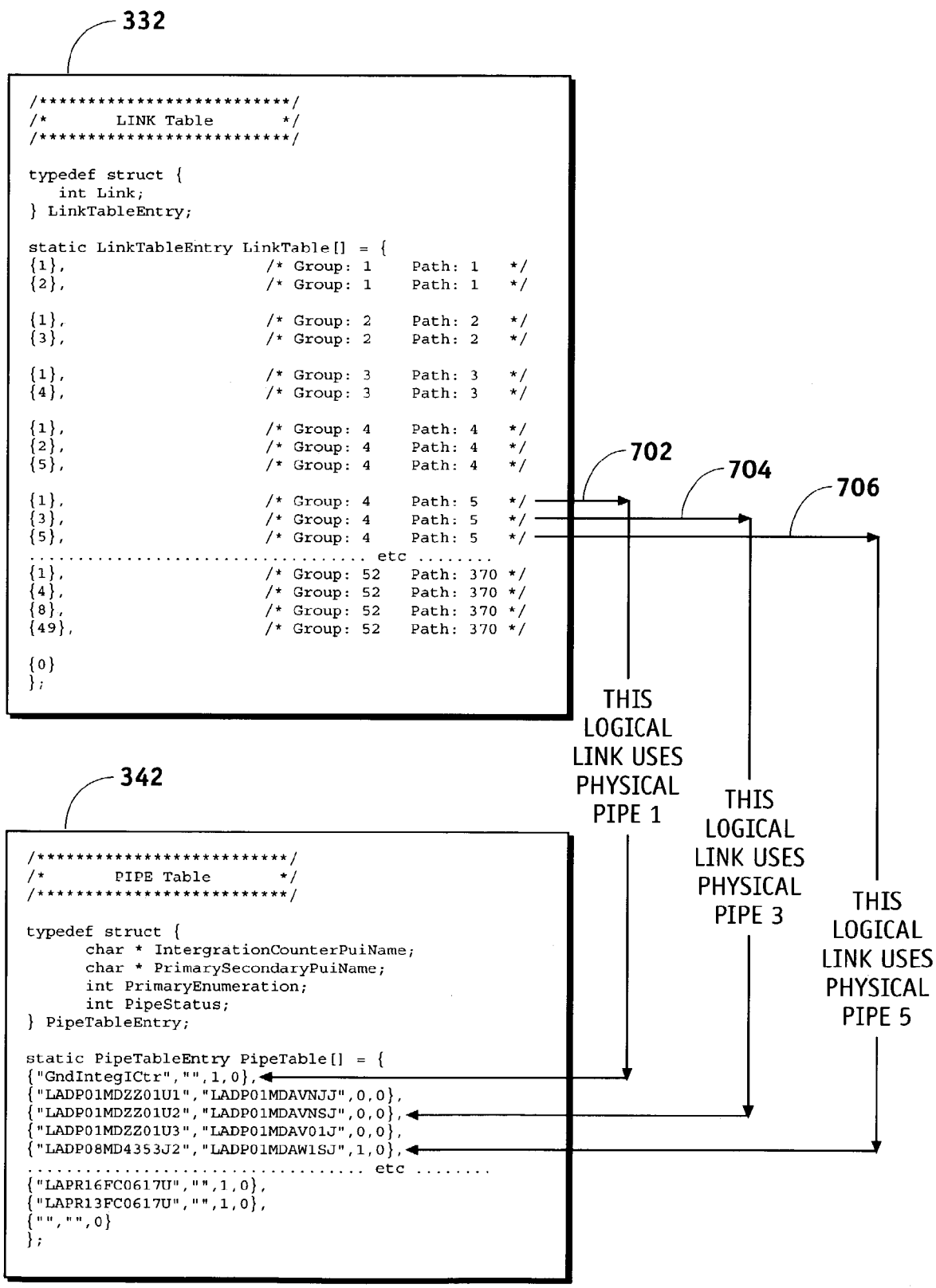
FIG. 7 illustrates details of the exemplary link table in relation to an exemplary pipe table.

FIGS. 7 and 8 show details of the pipe table 342 and its relationship with link table 332. Pipe table 342 comprises a structure-type variable containing one list for each counter and, therefore, for each particular node hosting each counter at the source of each link and also for each group of PUIs originating from each particular node. Each list in pipe table 342 comprises a PUI name for a counter 802 used to update an associated pipe status indicator 808, a PUI name for a primary/secondary status indicator 804 to indicate if the node and, therefore, the link is turned off, a reference value 806 containing the value used with the primary/secondary status indicator to indicate primary status, and the pipe status indicator 808. The reference value 806 is necessary because different nodes, having been made by different contractors, may use different values to indicate primary status. Each link 702, 704, and 706 in link table 332 associates 334 (FIG. 10) with one pipe data list.

The pipe status indicator 808 is periodically updated. For example, in a network 12 used by the ISS, telemetry is processed in a series of batch process cycles. The pipe status indicators 808 may be updated once per cycle. To update a pipe status indicator 808, a function entitled "IsChanging" takes the counter PUI name 802 for an argument, examines a data history associated with that counter PUI name 802 in ways known in the art, and returns a pipe status indicator 808. Another routine looks up appropriate data list in the pipe table 342 based on the PUI name and updates the pipe status indicator 808. In other embodiments, other update periods may be used. For example, an update period based upon a particular counter's update rate may be used. For further example, a pipe status indicator 808 may be updated every time the pipe status changes.

In use, the telemetry disambiguation software 24 takes a PUI name for an argument, looks up the PUI name in PUI table, finds the associated index to the particular PUI's group in the group table, looks up the indexed group in the group table and finds the associated indexes to the range defined by first and last path indexes in the path table, looks up the indexed range of paths in the path table and finds indexes to the range of links defined by first and last link indexes in the link table, looks up the range of indexed links in the link table and finds the associated indexes to the pipe table, looks up the indexed pipes to find the most recently updated pipe status indicators 808. If all the pipe status indicators 808 for at least one of the paths from the group from which the target data originates indicate operable nodes, then the target data is indicated as unambiguous.

Figure 28:
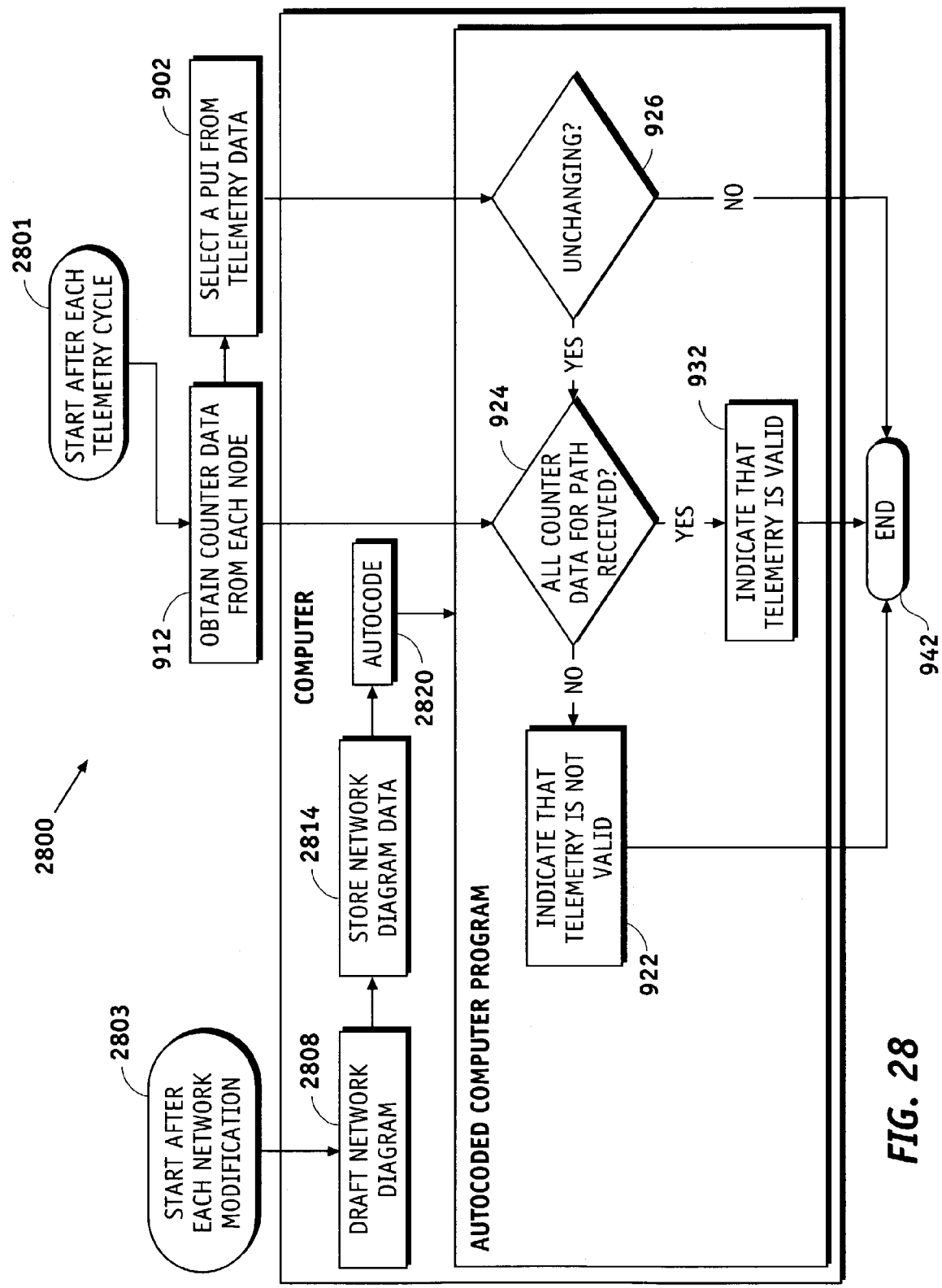
FIG. 28 illustrates a flowchart for an exemplary method of using an exemplary apparatus for disambiguating telemetry.

FIG. 28 shows an exemplary process 2800 for disambiguating data sent by exception. When first beginning, and after each network modification involving addition or subtraction of nodes or changes in links, process 2800 begins at step 2803 to generate network diagram 14. An interactive drafting tool, or computer program in computer 2806 may be used to generate icons representing the different nodes and links in network 12. In addition to the icons shown in FIG. 2 and discussed above, other icons may be added. For example, in an unusual network that has some nodes without counters, a unique icon, such as a circle, may be used to diagram such nodes. A counterless node may always be regarded as operating, and have its pipe status indicator 808 so indicate. In another unusual embodiment, the network 12 may comprise both duplex and simplex links, and different icons may be used for each.

Each time a new network is encountered or an old network is to be modified, the exemplary process 2800 begins at step 2803. Drafting step 2808 comprises obtaining a computer realization of a network diagram 14 (FIG. 1) in computer 2806. The network diagram is stored in step 2814 to supply data to autocoding 2820 to produce autocoded telemetry disambiguation computer program 24. Drafting, 2808, storing 2814, and autocoding 2820 may be done after each network diagram 14 is created or modified. While process 2800 performs all steps in a single computer, it will be obvious to those of skill in the art in light of this disclosure that separate computers or networks of computers may be used to accomplish steps of process 2800, such as steps 2808, 2814, and 2820.

For each telemetry cycle, process 2800 starts at step 2801 to initiate acquisition of counter data 32 in step 912 for each node originating counter data 32. The step of obtaining 912 counter data 32 may include updating pipe status indicators 808 (FIG. 8) and group status indicators 406 (FIG. 4). By updating the group status indicator 406 for each inoperable node based on the lack of counter data 32 from that inoperable node, only the PUI table 302 and group table 312 may be accessed to resolve the ambiguity of all PUIs originating from that inoperable node.

Once the data structures 25 have been updated for the current telemetry cycle, each PUI may be selected in turn in step 902 and evaluated in step 926. If the PUI is found to be changing in step 926, the telemetry is not ambiguous, so the process ends at step 942. Otherwise, step 924 uses counter data, downloaded from each operating network 12 node in step 912, to determine if the selected PUI is unambiguous. If step 924 finds counter data, or indicators thereof, for each node in any path between the node originating the PUI and the destination node 102 (FIG. 1), then the PUI is unambiguous, or valid, and is so designated in step 932. Otherwise, the unchanging PUI is designated as ambiguous, or not valid, in step 922. After either determination 922 or 932, the process 2800 ends at step 942.

Figure 11:
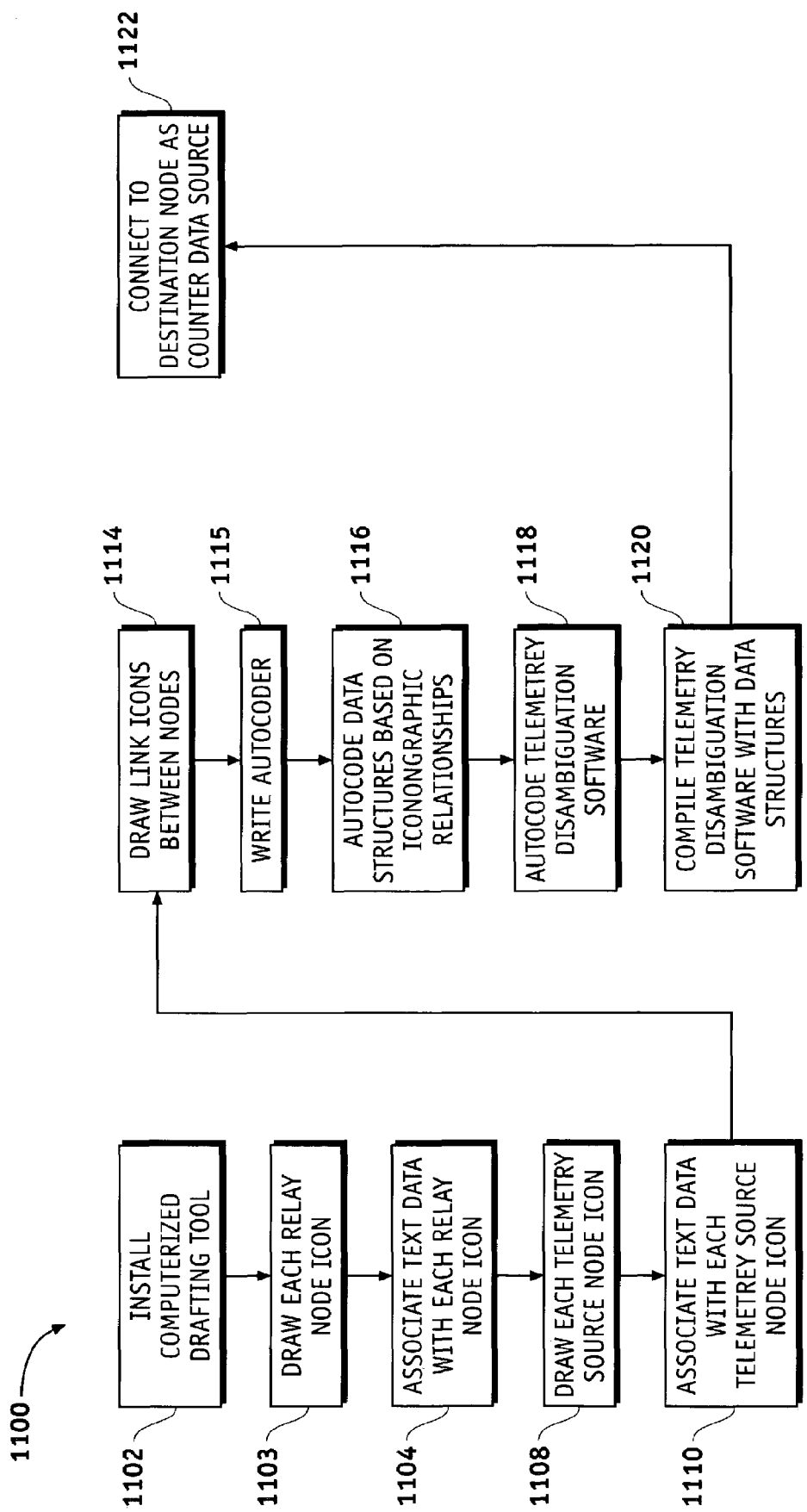
FIG. 11 illustrates yet an exemplary process flow for a method of disambiguating telemetry.

FIG. 11 shows an exemplary process flow 1100 for an exemplary method for making an apparatus for disambiguating telemetry. In step 1102, a computerized drafting tool is installed on a computer 1106 (FIG. 11). The drafting tool is preferably an interactive drafting tool. For example, step 1102 may include installing VISIO software on a personal computer 1106. Those of skill in the art will, in light of this disclosure, appreciate the variety of commercial-off-the-shelf (COTS) drafting tools and COTS and customized computers that may be used in step 1102. In a particular embodiment, step 1102 may be accomplished by writing a computerized drafting tool. In an alternate embodiment, the computerized drafting tool may comprise hardcopy drafting equipment, an optical scanner, a computer, and optical character recognition software. The step of installing a computerized drafting tool is satisfied by providing a way to translate a network diagram 14 (FIG. 1) into machine-readable data. The computerized drafting tool is used to create network diagram 14, perhaps beginning with step 1103 by drawing each relay node icon. Relay node icons may share a common iconographic shape (see FIGS. 2, 3, and 9). In step 1104, text data is associated with each relay node icon. Preferably, the drafting tool provides a facility for making such associations, as with VISIO software, for example. Otherwise, a unique identifier of each relay node icon may be included in a data structure containing the text data. Text data may include the node, or icon, name 1202, box name 1204, switch state name 1203, counter name 1208, counter rate information 1209, counter format information 1210, the primary/secondary status indicator name 1206, primary/secondary status indicator rate information 1207, primary enumeration code 1211, and a list 1214 of telemetry data elements originating from the node (FIG. 9). Other embodiments may include additional text data related to other purposes for which a network diagram 14 (FIG. 1) may be additionally used. Steps 1103 and 1104 may be iterative, adding text data to each relay node icon as it is drawn.

In step 1108, the telemetry source node icons, if any, are drawn. Telemetry source node icons share a shape distinct from relay node icons (see FIG. 2, comparing telemetry source node icons 142-144 with relay node icons 131-132). In step 1110, text data is associated with each telemetry source data icon. The text data associated with telemetiy source node icons includes a node name, box name, counter name, status indicator, and a list of telemetry data elements originating from the node.

In step 1114 and referring additionally to FIGS. 1, and 2, 3, and 9, the link icons, such as arrows 135 and 137, are drawn for each link between each pair of linked nodal icons (e.g. 151-131 and 151-132). The links of a particular network may be less than all possible links. The computerized drafting tool associates each link icon with the nodal icons to which it connects, and differentiates the icon connected to the head of the arrow from the tail of the arrow. The arrows 135 and 137 are shown pointing in the direction opposite the direction of information flow, but any consistent convention may be used. The link icons and the nodal icons, as connected and annotated with associated text data comprise network diagram 14. When the diagram is saved 180 using the computerized drafting tool, the network diagram 14 is saved in a data file which may be read by the computerized drafting tool or by other programs. For example, the data file may be read by an autocoder 20 or graphic translation computer program 20.

If an autocoder 20 is already available, step 1115 may be skipped. Otherwise, an autocoder 20 may be written using a macrocode facility within the computerized drafting tool. For example, the VISIO drafting tool has a macrocode facility that permits writing programs, including autocoders, in Visual Basic for Applications. In step 1116, the autocoder 20 program reads the data file containing network diagram data 18 by icon, reorganizes the network diagram data 18, and stores the reorganized data in network data structures 25 based upon iconographic relationships which reflect network nodal relationships. Implicit within the reorganization and storage of the reorganized network data is the finding of all paths through the network from each node. The network data structures 25 represent all paths through the network. The details of step 1116 will be discussed in greater detail below. The autocoder also produces, in step 1118, telemetry disambiguation runtime code 24 which will use the data structures 25 to find possible paths for a particular data element, or PUI. The telemetry disambiguation software 24 may stop searching after finding one possible path if that path is a good path. A good path is a path wherein all nodes are operating. The telemetry disambiguation software 24 is capable of finding and searching all possible paths from a particular data element's originating node to the destination node 102.

Preferably, the telemetry disambiguation software 24 and the data structures 25 are compiled together in step 1120. Compilation implies that the data structures 25 are formed as structure-type variables with associated text data (i.e., 1208-1210) stored as data therein. For example, data structures 25 may comprise a linear hierarchy of implicitly indexed tables of data lists, wherein the hierarchy is based upon network structural relationships (See FIGS. 3-8).

In step 1122, the compiled telemetry disambiguation software 24 may be installed in a computer 2806 (FIG. 28) having access to the destination node 102 as a data source for counter data 32 and telemetry data 30. This may be the computer 2806 (FIG. 28) upon which the network diagram 14 was drafted and the telemetry disambiguation software 24 was compiled. Thus connected, the telemetry disambiguation software 24 receives a data element name, or PUI, as an input and searches network data structures 25, updated based upon received counter data, for any good path for that PUI. A PUI with a good path is an unambiguous PUI. In some embodiments, the telemetry disambiguation software 24 may be hosted on a different computer.

Figure 12:
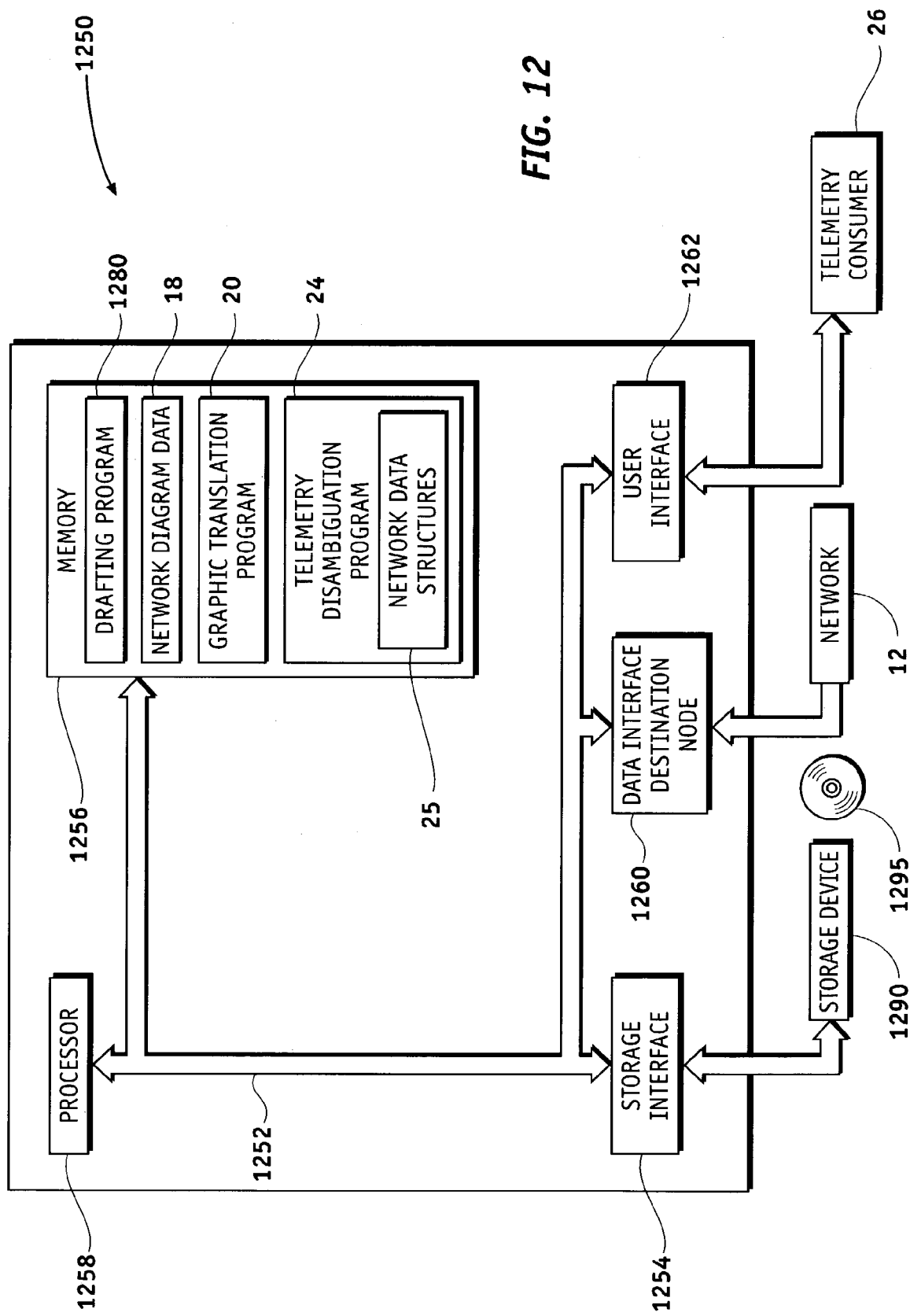
FIG. 12 illustrates an exemplary apparatus for making a tool for disambiguating telemetry data.

FIG. 12 shows a diagram of an exemplary apparatus 1250 for disambiguating telemetry sent by exception over a multi-path network 12. The apparatus comprises a processor 1258 communicating with a memory 1256 over a data bus 1252 in computer 1006. Processor 1258 further communicates over bus 1252 with storage interface 1254, data interface 1260, and user interface 1262. Storage interface 1254 provides read and write access to storage device 1290 comprising machine readable media, which may include removable machine-readable media 1295. The data interface 1260 provides access to data 30 and 32 (FIG. 1) arriving at the destination node 102 (FIG. 2) of network 12 (FIG. 1). User interface 1262 provides interactive access to consumers of disambiguated telemetry 26 (FIG. 1), such as an IVHM system, as well as autocoder programmers and network diagram draftsmen.

Memory 1256 contains a drafting program 1280 operable to enable a user to create, modify, and store a network diagram 14 as network diagram data 18. The drafting program 1280 is preferably an interactive program 1280 accessed by a draftsman through the user interface 1262. In an alternate embodiment, drafting program 1280 may read data about the network from a pre-existing database and generate all or part of the network diagram 14 there from. The network diagram comprises network diagram data 18, which is stored in memory 1256.

Memory 1256 also contains graphic translation program 20, or autocoder 20, which may be read into memory 1256 from machine-readable media in storage device 1290. The graphic translation program 20 reads the network data 18 to produce network data structures 25 stored in memory 1256 and in storage device 1290. Network data structures 25 may contain every path from each node to the destination node 102. The telemetry disambiguation program 24 may also be autocoded from the graphic translation program 20. In most embodiments, the telemetry disambiguation program 24 code is predetermined and merely needs to be printed to a file for compilation. In some embodiments, the file containing compilable telemetry disambiguation program 24 code may be supplied. The network data structures 25 and the telemetry disambiguation program 24 code may be compiled together to form the telemetry disambiguation program 24.

Telemetry disambiguation program 24 is operable to receive inputs from two sources. First, counter data 32 (FIG. 1) from destination node 102 (FIG. 2) of network 12 crosses the data interface 1260 and may be received by a routine in the telemetry disambiguation program 24 operable to update the pipe status indicators 808 (FIG. 8) in the pipe table 342 (FIG. 8). If the counter data 32 (FIG. 1) from a particular node is changing, that node is considered operable and the pipe status indicator 808 (FIG. 8) for that node is set to indicate that status. Otherwise, the pipe status indicator 808 for that node is set to indicate that the particular node is inoperable.

The second input to the telemetry disambiguation program 24 arrives via the user interface1262 in the form of a PUI, or telemetry data element name, to be disambiguated. The telemetry disambiguation program 24 is responsive to the PUI to search the network data structures 25 for any good path from the PUI's originating node to the destination node 102. If a good path is found, an indicator that the data of the PUI is unambiguous is associated with the PUI. The associated indicator is returned to the consumer 26. When the consumer 26 is an IVHM system, the data of the PUI is then processed by prognostic and diagnostic algorithms to reach a decision regarding changing the state vector of the telemetered vehicle. The output of the IVHM system may be implemented automatically, resulting in a state change of the vehicle. For example, if diagnostic algorithms of the IVHM system determine that an over-temperature condition exists due to sunlight impingement on a component, the IVHM may change the attitude of the vehicle to cool over-temperature component.

Figure 13:
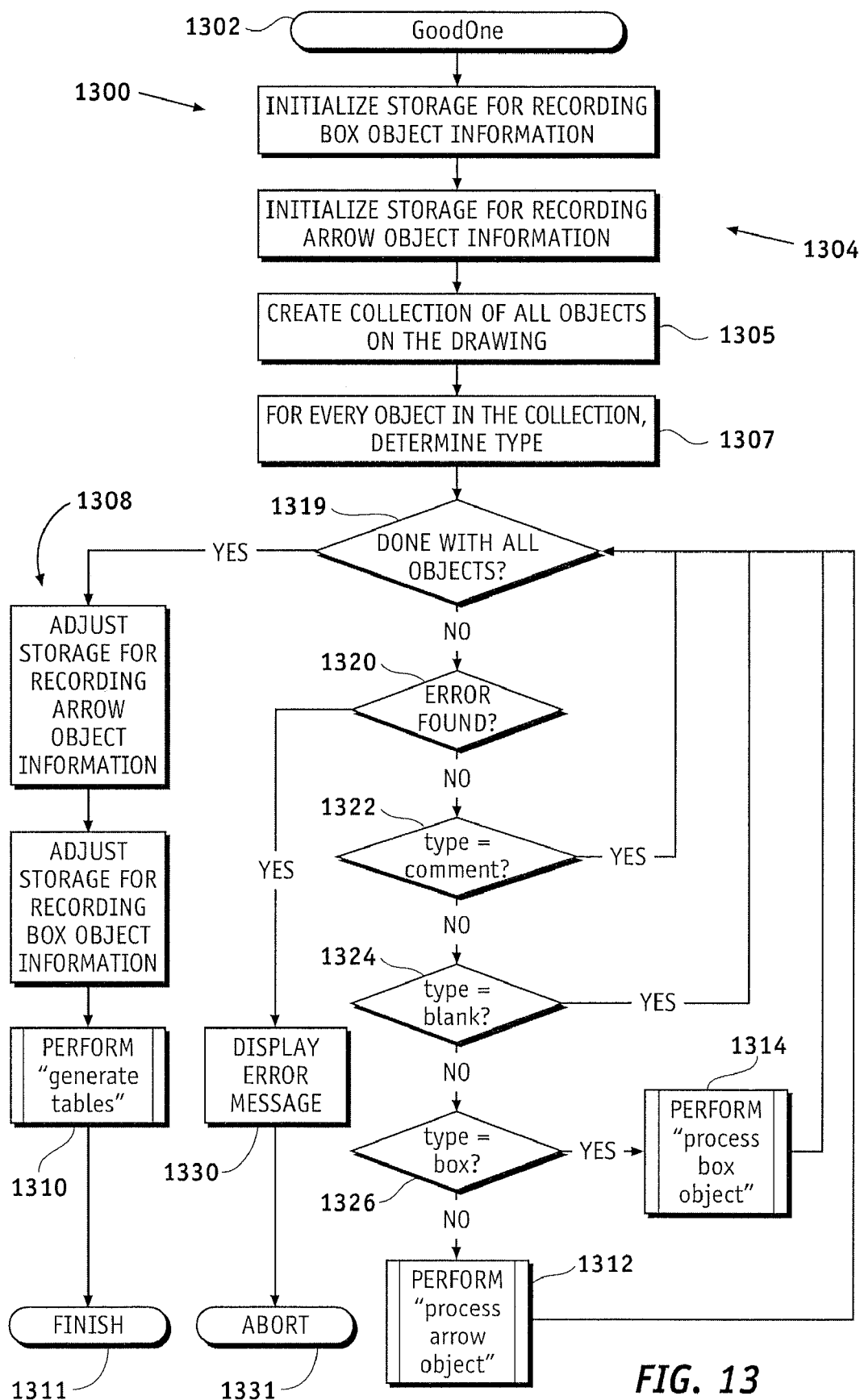
FIG. 13 illustrates a flowchart of an exemplary autocoder.

FIG. 13 shows a first level of a flowchart for an exemplary autocoder 20. The process 1300 "GoodOne" starts at step 1302 and ends 1311 after generating 1310 the network data structures 25, or tables 25, used to store all paths through the network 12. The process 1300 begins with preparatory steps 1304 to ensure storage is available. All objects in the drawing, comprising icons and any associated text strings, are collected 1305 and associated 1307 with their respective types. The collection 1305 may be ordered, beginning with the destination node 102 and moving through a first tier, comprising all nodes directly connected to the destination node, to a second tier comprising nodes directly connected to first-tier nodes, and so forth. This order is preserved in subsequent steps. Until all objects have been processed, step 1319 cycles through steps 1320, 1322, 1324, 1326, and 1312 or 1314. Step 1320 searches for errors, which may include an end-of-file type error, and aborts 1331 the process 1300 after displaying 1330 an error message. If no error has occurred, steps 1322 and 1324 step over comments and blank lines to reach the next iconographic object. If the iconographic object is a box type, such as a relay node or data source node, decision step 1326 passes control to step 1314. Otherwise, step 1326 passes control to step 1312. When all objects have been processed, decision step 1319 branches toward finish 1311, adjusting 1308 storage and generating 1310 tables 25.

Figure 14:
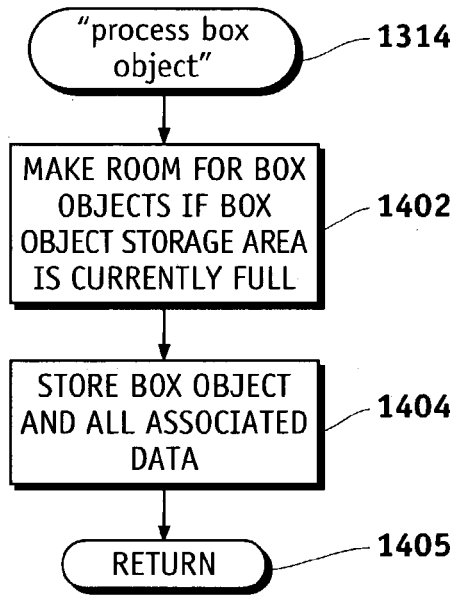
FIG. 14 illustrates a flowchart for an exemplary autocoder routine for processing a node icon read from network diagram data.

FIG. 14 shows step 1314, "processes a box object," in more detail. Step 1402 ensures available storage area for a new box object and step 1404 stores the box object and the data associated with the box object, including text string data. Step 1405 returns control to process 1300 (FIG. 13).

Figure 15:
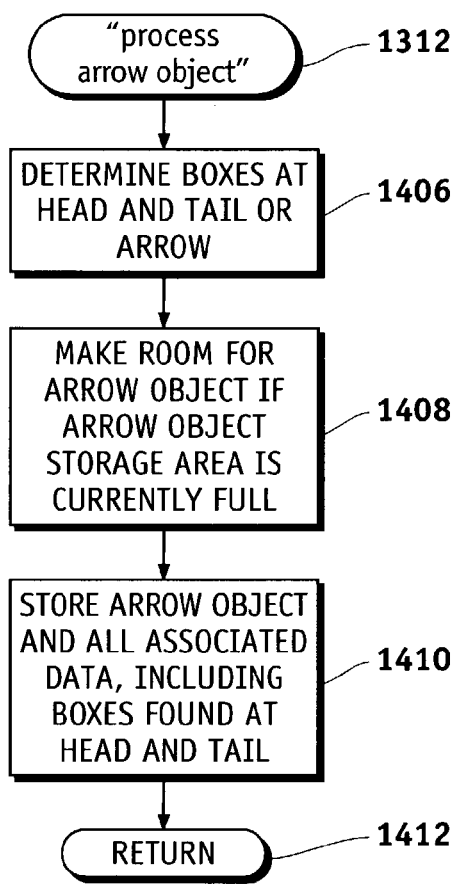
FIG. 15 illustrates a flowchart for an exemplary autocoder routine for processing a link icon read from network diagram data.

FIG. 15 shows step 1312, "process arrow object," in more detail. Step 1406 determines the boxes, or node icons, at the head and tail of the arrow icon. The head and tail boxes uniquely define the arrow icon. Step 1408 ensures available storage area for a new arrow object and step 1410 stores the arrow object and the data associated with the arrow object, including boxes found at the head and the tail of the arrow. Step 1412 returns control to process 1300 (FIG. 13).

Figure 16:
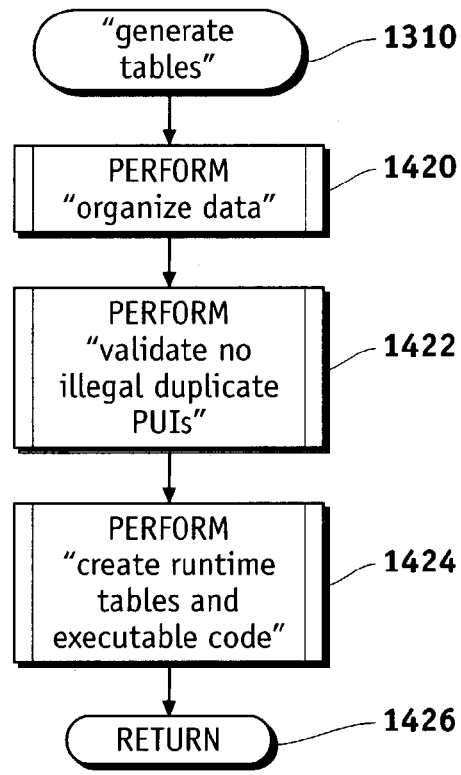
FIG. 16 illustrates a flowchart for an exemplary autocoder routine for producing data structures containing all paths through a network from each particular node.

FIG. 16 shows step 1310, "generate tables," in more detail. Step 1420 organizes data into tables 302, 312, 322, 332, and 342 (FIGS. 3-8) comprising a linear hierarchy of indexed tables of data lists. Step 1422 checks the PUI table 302 for duplicate PUI table entries and warns of any duplicates found. Step 1424 compiles the tables 302, 312, 322, 332, and 342 with the software for searching the tables to create executable runtime code. Step 1426 returns control to process 1300 (FIG. 13).

Figure 17:
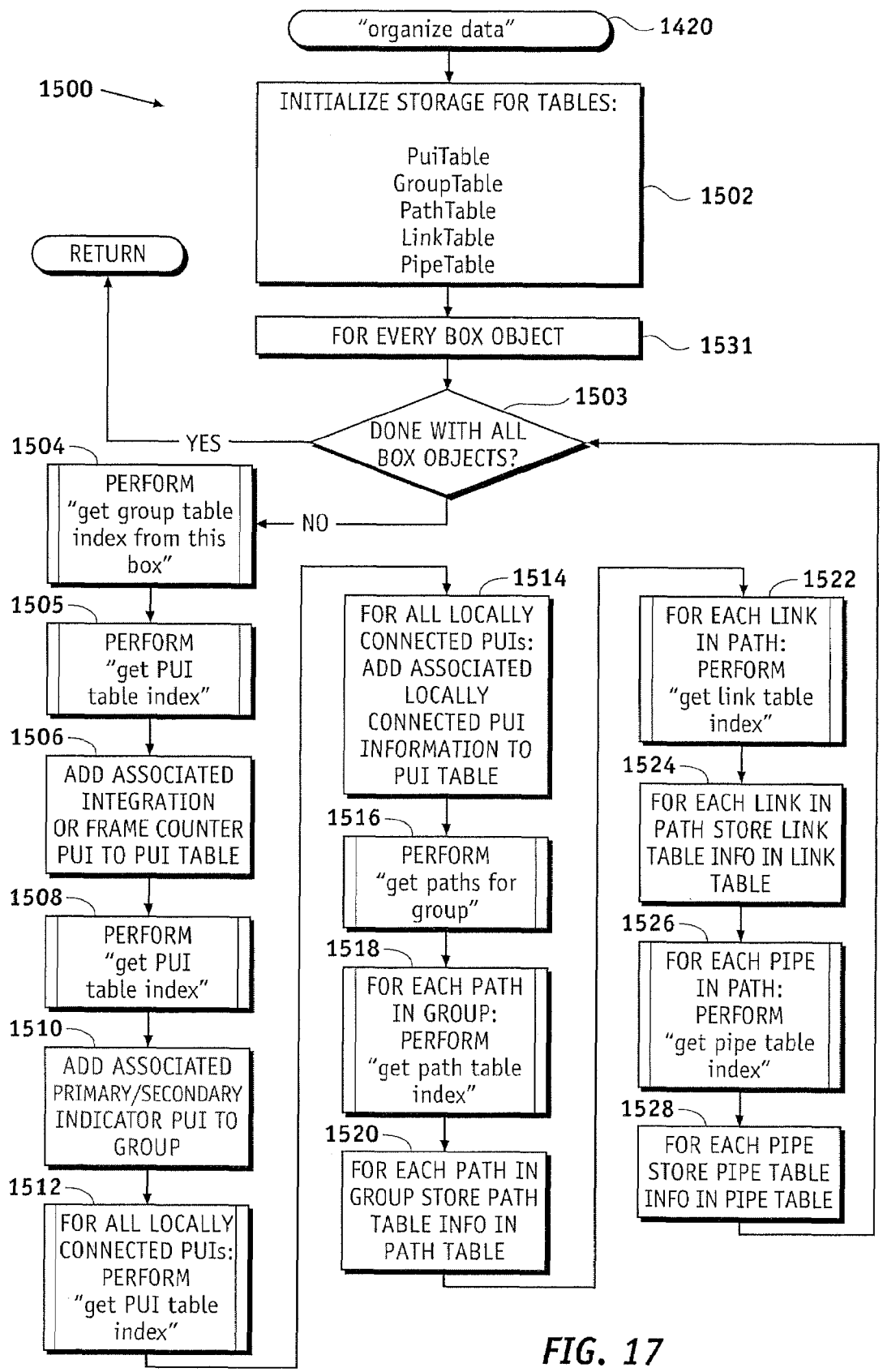
FIG. 17 illustrates a flowchart for an exemplary autocoder subroutine for reorganizing data read from network diagram data.

FIG. 17 shows step 1420, "organize data," in more detail as process 1500. Step 1502 initializes storage for a tables that are precursors to PUI table 302, group table 312, path table 322, link table 332, and pipe table 342. Step 1531 takes each box object, or nodal icon, stored in step 1404 and processes it into the tables. Each nodal icon becomes, in turn, the current nodal icon, or current node. Decision step 1503 detects exhaustion of the box object supply and terminates process 1500, returning control to step 1422.

Figure 19:
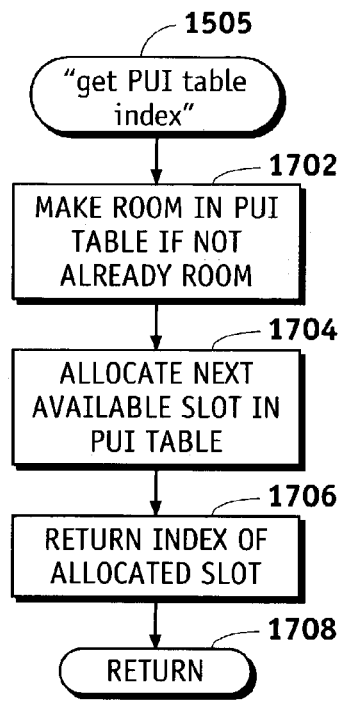
FIG. 19 illustrates a flowchart for an exemplary autocoder subroutine for obtaining an index for a slot in a process unique identifier (PUI) table.
Figure 20:
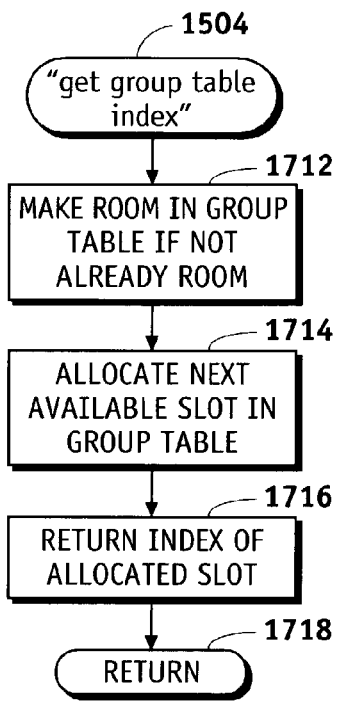
FIG. 20 illustrates a flowchart for an exemplary autocoder subroutine for obtaining an index for a slot in a group table.

Step 1504 finds or creates 1712 (FIG. 20) the next available slot in the precursor group table, allocates 1714 the index associated with that slot to the current box, or nodal icon, returns 1716 the index and returns control 1718. Step 1505 finds or creates 1702 (FIG. 19) the next available slot in the precursor PUI table, allocates 1704 it, returns 1706 the index and returns control 1708. Step 1506 adds the counter name 802 (FIG. 8), or counter PUI, to the indexed position in the precursor PUI table. Adding a PUI to the precursor PUI table may include adding the PUI name 1208, update rate 1209, format indicator1210 (FIG. 9) and a group index, all in a list at the indexed position in the precursor PUI table. The source of this PUI information is the data stored in step 1404 (FIG. 14), which was read from the network diagram data 18 (FIG. 1) in step 1305. Step 1508 again finds or creates 1702 the next available slot in the precursor PUI table, and step 1510 adds the Primary/Secondaly indicator PUI to what has become a group of PUIs associated with the current nodal icon. Step 1512 gets a PUI table index and step 1514 inserts a PUI in the precursor PUI table at the indexed position for each locally connected PUI. A locally connected PUI is a PUI, or telemetry data element name, for data that originates from the node that is represented by the current nodal icon.

Figure 24:
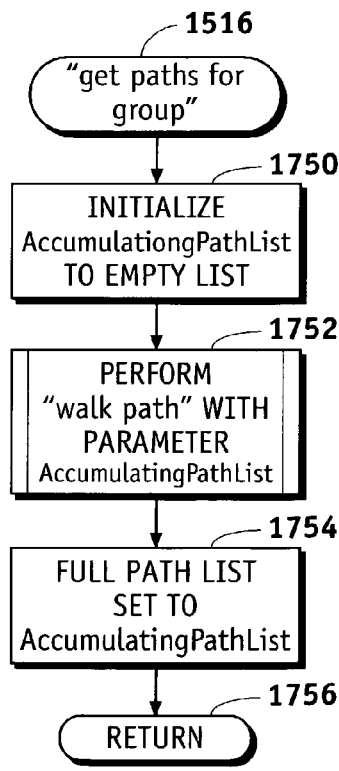
FIG. 24 illustrates a flowchart for an exemplary autocoder subroutine for obtaining all paths through a network from each node to the destination node.

FIG. 24 shows an exemplary sequence of steps for finding all designed paths. When all PUIs have been inserted in the precursor PUI table for the current node, step 1516 finds all arrows having head ends associated with the current nodal icon. Step 1516 first empties 1750 the accumulating path list, then finds 1752 the links of each path originating from the node represented by the current nodal icon. Step 1752 further stores each link for each path originating from the node represented by the current nodal icon in the accumulating path list, each sequence of links representing a path. Step 1754 adds the accumulated path list to the full path list and step 1756 returns control to process 1500.

Figure 26:
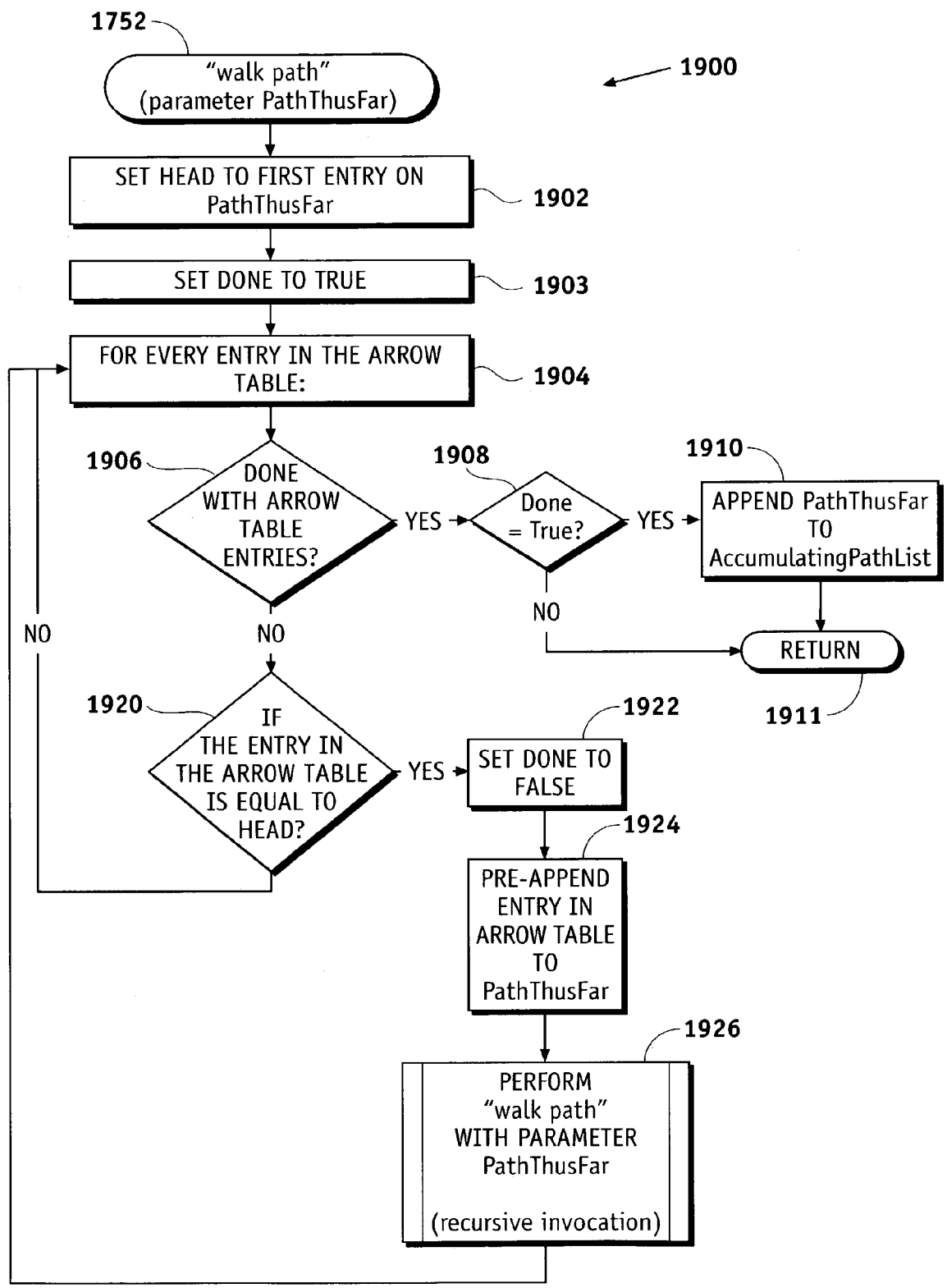
FIG. 26 illustrates a flowchart for an exemplary autocoder subroutine for finding all paths through the network.

FIG. 26 shows step 1752 (FIG. 24) further may be implemented by exemplary process 1900. Step 1902 sets a variable "Head", to a current nodal icon identifier, or node index. Step 1903 sets an escape criterion. Step 1904 accesses each arrow in the arrow table, which was created in step 1410 (FIG. 15). Step 1906 checks for the end of the arrow table. Decision step 1920 determines if the "head" portion of the entry in the arrow table matches the value in the "Head" variable set in step 1902. Each found arrow head associated with the current nodal icon represents the first link of a path from the current node associated with the current nodal icon to the destination node 102. If step 1920 determines that the current arrow points to the current node, step 1922 sets a recursion switch and step 1924 pre-appends the current arrow data to an initially empty accumulator of path data, PathThusfar.

Step 1926 recursively calls step 1752 with the tail of the current arrow in position to provide the value of "Head" for the recursive call: Thus, each path to the destination node is found and stored in PathThusfar. At the end of each recursive call, when all arrows have been considered, step 1906 sends control to decision step 1908. Step 1908 tests the recursion switch set in step 1922 returns 1911 without updating the accumulating path list if recursions still remain to be completed. If all recursions are complete, step 1910 appends all the path data in PathThusfar to the accumulating path list. Process 1900 uses the accumulating path list to build paths from the destination node 102 toward the source node, following the order created in step 1305. By beginning with the destination node 102 and working toward the source, all lower links in a path are already known when the current node is processed.

Figure 21:
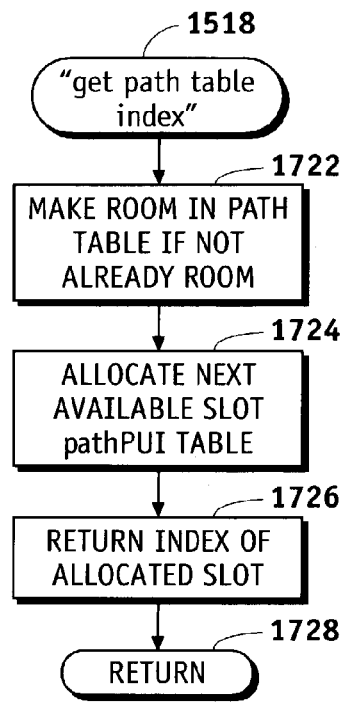
FIG. 21 illustrates a flowchart for an exemplary autocoder subroutine for obtaining an index for a slot in a path table.
Figure 22:
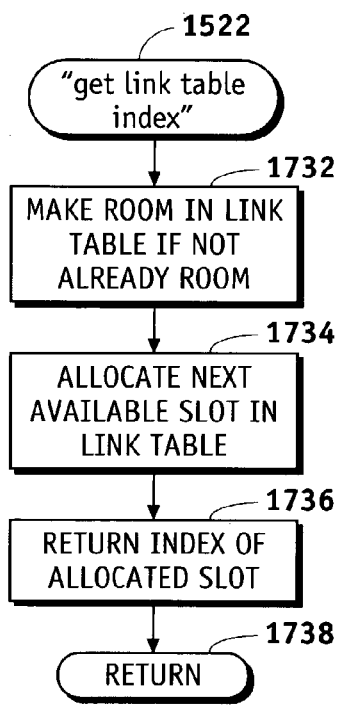
FIG. 22 illustrates a flowchart for an exemplary autocoder subroutine for obtaining an index for a slot in a link table.
Figure 23:
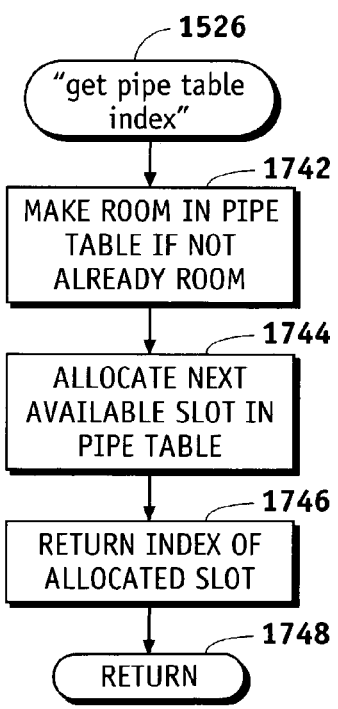
FIG. 23 illustrates a flowchart for an exemplary autocoder subroutine for obtaining an index for a slot in a pipe table.

For each path, step 1518 finds or creates 1722 (FIG. 21) the index of the next slot in the precursor path table, allocates 1724 the index to the current path, returns 1726 the found index, and returns control 1728. Step 1520 stores each path for the current node in precursor path table. For each link in each path from the current node, step 1522 finds or creates 1732 (FIG. 22) the next available slot in the precursor link table, allocates 1734 it to the current link, returns 1736 the index of that slot, and returns control 1738. Step 1524 stores each item of link information in a link table that is a precursor to link table 332. For each pipe in each path from the current node, step 1526 finds or creates 1742 the next available slot in precursor pipe table, allocates 1744 the slot to the current pipe, returns 1746 the index of the allocated slot, and returns control 1748. Step 1528 stores pipe table information for each pipe in a list in the pipe table. Process 1500 processes all box objects.

Figure 18:
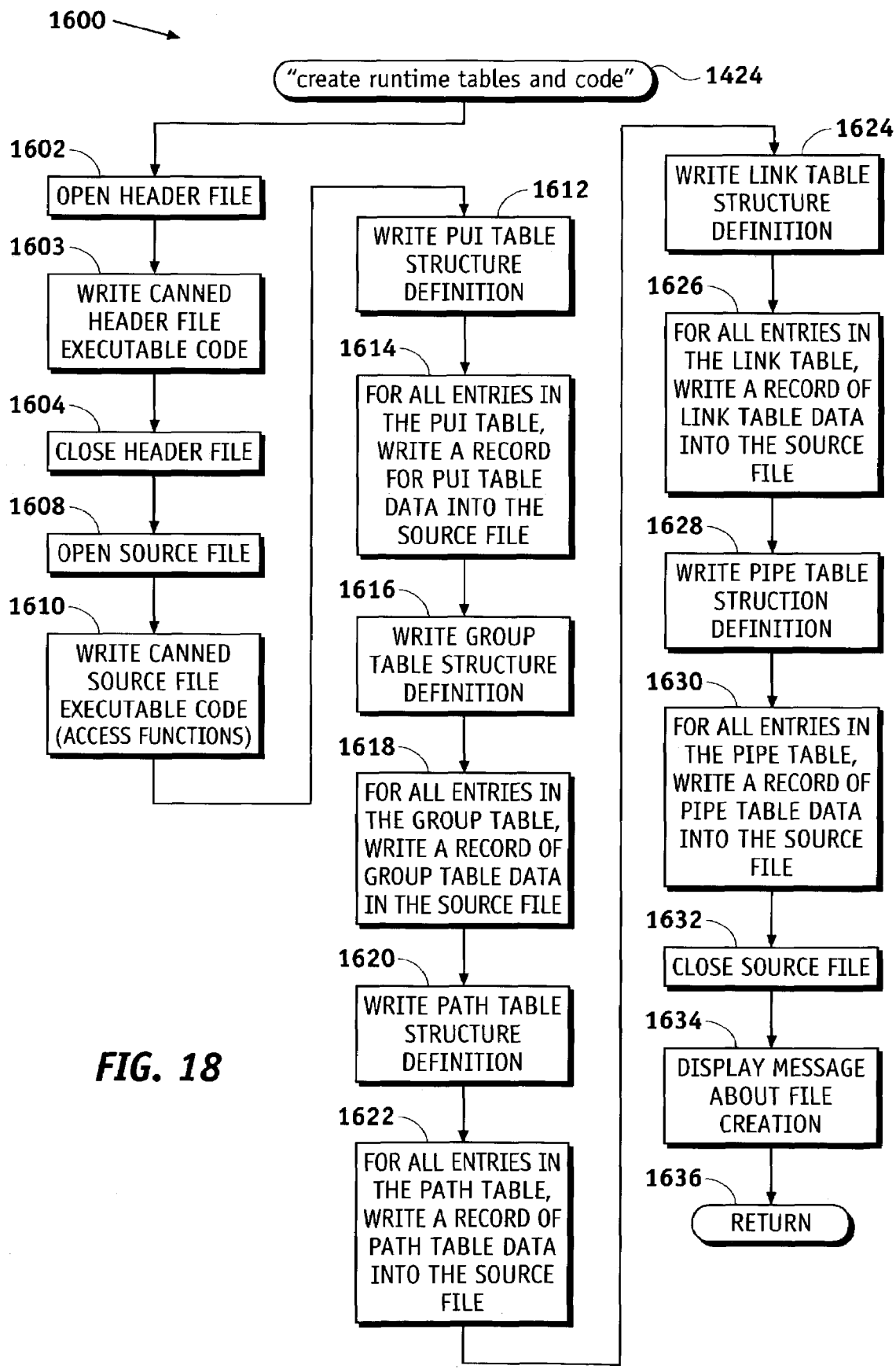
FIG. 18 illustrates a flowchart for an exemplary autocoder subroutine for storing reorganized data.

FIG. 18 shows a flow chart of exemplary process 1600 implementing step 1424 (FIG. 16) "create runtime tables and code." which is a sub-step of step 1310 (FIG. 13) "perform 'generate tables'". Steps 1602-1604 opens a header file, writes a predetermined, or canned, header for executable code, and closes the header file. Steps 1608 and 1610 respectively open a source code file for writing, and write, predetermined source code for accessing data. Step 1612 writes the structural definition of PUI table 302, and step 1614 writes data from the precursor PUI table into the body of PUI table 302. The data structures of the precursor PUI table and the body of PUI table 302 may be identical. Step 1616 writes the structural definition of group table 312 and step 1618 writes data from the precursor group table into the body of group table 312. The data structures of the precursor group table and the body of group table 312 may be identical. Steps 1620 and 1622 perform similar functions for path table 322. Steps 1624 and 1626 perform similar functions for link table 332. Steps 1628 and 1630 perform similar functions for pipe table 342. Step 1632 closes the source file and step 1634 displays a message that the file has been created. Step 1636 returns control. The source code thus written may be compiled before or after step 1636.

FIGS. 19-24 are discussed above under FIG. 17.

Figure 25:
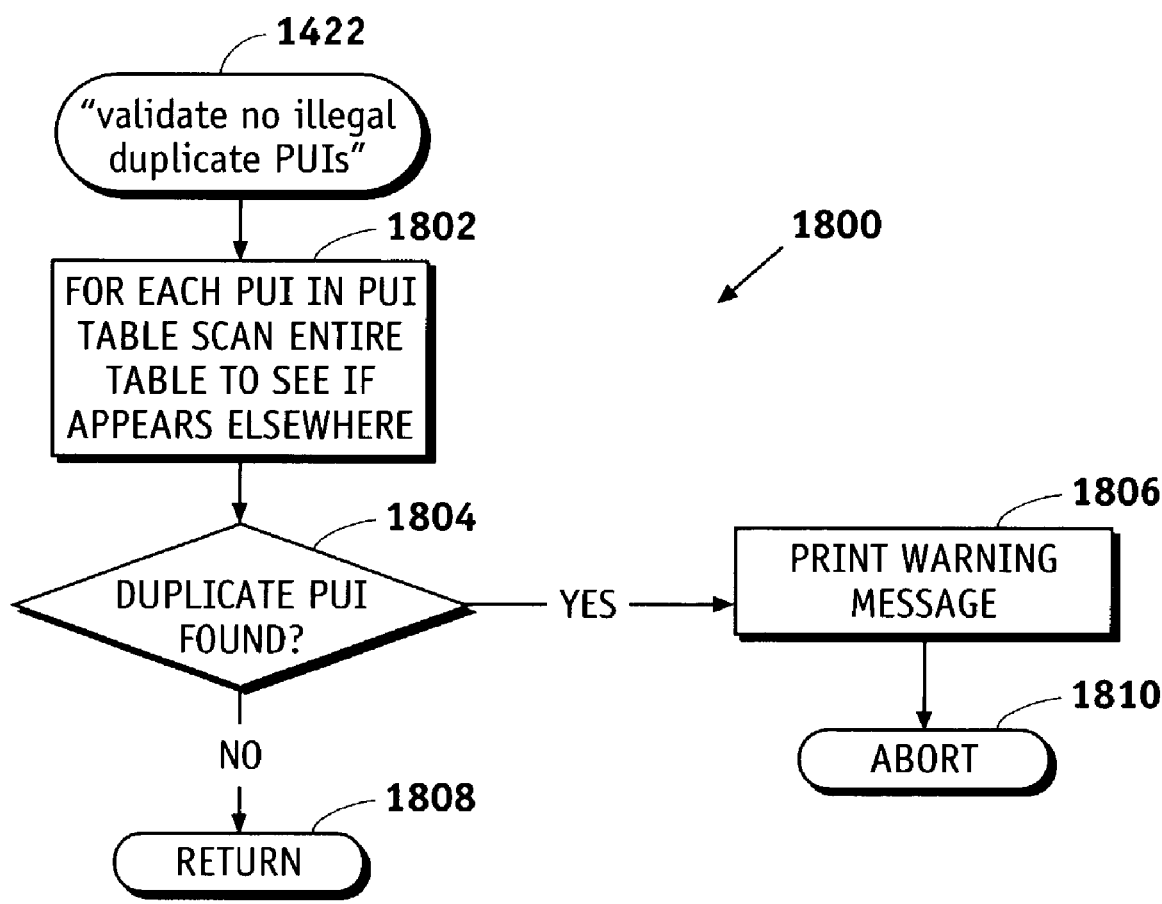
FIG. 25 illustrates a flowchart for an exemplary autocoder subroutine for detecting duplicate PUIs in a PUI table.

FIG. 25 shows a flow chart of an exemplary process for step 1422, "validate no illegal duplicate PUIs." Step 1802 searches the precursor PUI table for each PUI to find duplicate PUIs. If a duplicate PUI is found 1804, a warning message is printed in step 1806 and process 1800 is aborted in step 1810. If no duplicates are found 1804, control is returned 1808. In an alternate embodiment, a duplicate PUI may be removed automatically. However, the possibility that a duplicate PUI reflects a problem in the underlying network diagram 14 suggest that step 1806 not be omitted, even when a duplicate PUI is removed.

Figure 27:
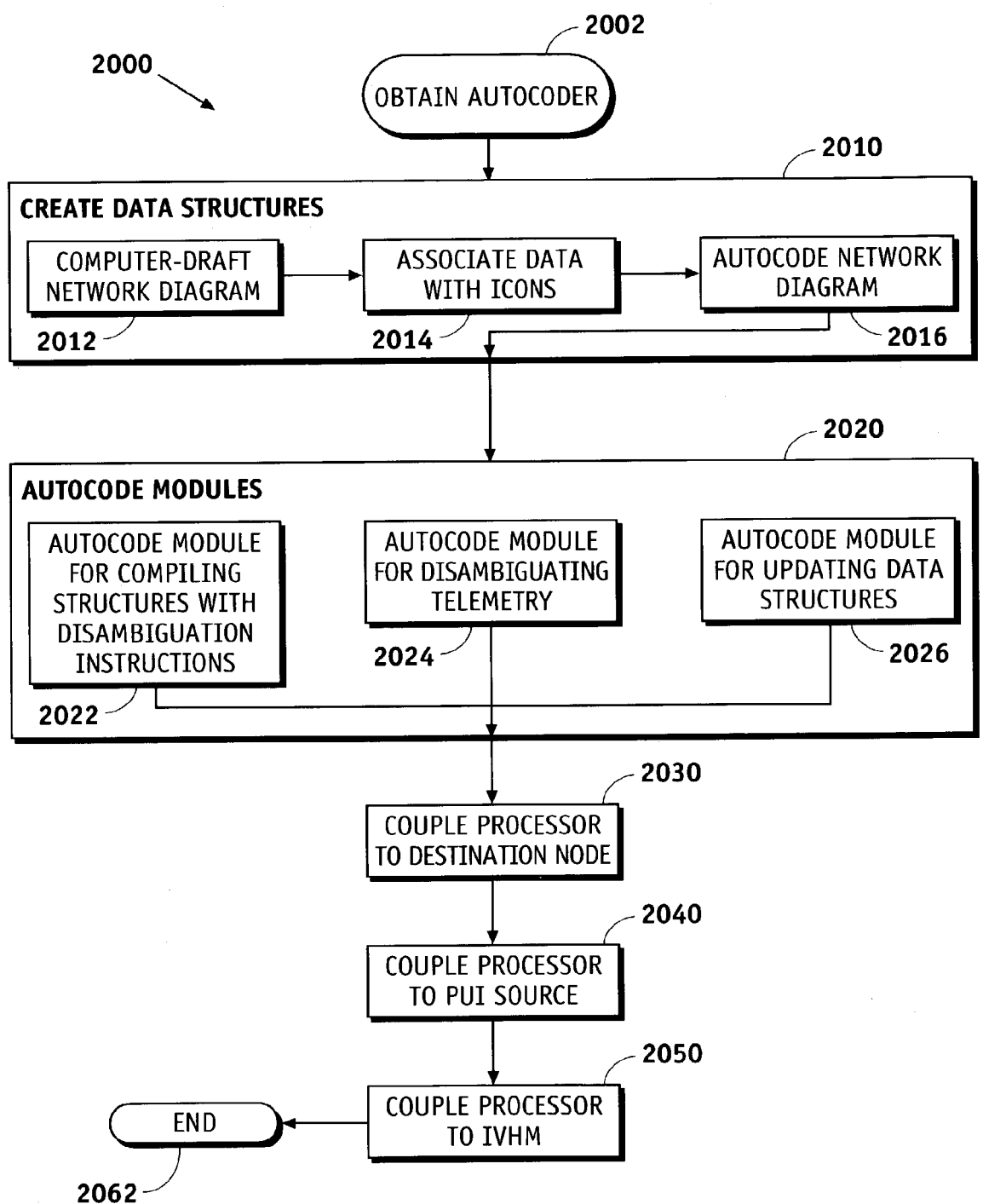
FIG. 27 illustrates a flowchart for an exemplary method of making an exemplary apparatus for disambiguating telemetry.

FIG. 27 shows an exemplary process flow for making an apparatus for disambiguating telemetry beginning with obtaining an autocoder 20 (FIG. 1) in step 2002. Initially, step 2002 may include writing the autocoder 20 as previously described. In most embodiments, step 2002 may include obtaining the autocoder 20. The autocoder 20 may be reused whenever network 12 is modified. In step 2010, data structures 25 for holding designed paths and updated status indicators 411 (FIG. 4) and 808 (FIG. 8) are created. Step 2010 may include step 2012 computer drafting a network diagram. Other methods of producing a network diagram 14 (FIG. 1) may be substituted in conjunction with means to translate the drawing into machine-readable data. In step 2014, data is associated with icons in the network diagram 14. For example, using VISIO software, text can be typed into box icons, forming and association between the icon and the text data. Other methods of making associations 2014 between text data and icons are also contemplated. For example, text data may be read in for each icon from a separate file. The end result of steps 2012 and 2014 is machine-readable data adapted to be autocoded into data structures 25 (FIG. 1) for a program for disambiguating telemetry 24. The adaptation consists of having data describing the network 12 and associated data describing the data produced in the network 12 in a form to be read by the autocoder 20 (FIG. 1). In step 2016, the machine-readable data is autocoded into data structures 25 (FIG. 1). This step includes finding all designed paths through the network 12 from each node 13 (FIG. 1). The details of the autocoder 20 and the data structures 25 are discussed in detail starting with FIG. 13 and FIG. 4, respectively. At the end of step 2016, step 2010 may be complete. Step 2010 may be repeated when the network 12 is modified.

Step 2020 autocodes, or writes processor instructions for searching 2024, compiling 2022, and updating 2026. An autocoder 20 is a computer program that writes other computer programs. Step 2024 writes processor instructions for disambiguating telemetry. The instructions may be written 2024 in any language, preferably a high-order language. In a preferred embodiment, the instructions are written in a macrocode language included in the drafting program environment. For example, Visual Basic for Applications from Microsoft Corporation is a macrocode language used with VISIO. The instructions provide for finding all possible paths for a particular PUI by searching the data structures 25 (FIG. 1) and determining if all nodes on at least one possible path are operating, based on updated status indicators such as 808 (FIG. 8) or 406 (FIG. 4). The code to update the status indicators is produced in step 2026 and may be incorporated into program 24, written as a separate program in the same file, or be an entirely separate program. The output of step 2026 should be a program of instructions executable to analyze counter data 32 (FIG. 1), draw conclusions and update data structures 25 from step 2010 based on those conclusions. Step 2022 provides processor instructions to compile the telemetry disambiguation instructions from step 2024 with the data structures 25 from step 2010. Compilation requires that the data structures 25 be written in compilable form, such as structure type variables. In some embodiments, all of the processor instructions from steps 2024, 2026, and those intrinsic to the output of step 2010 may be compiled together.

The written instruction sets, or code modules, are loaded into a processor 1258 (FIG. 12) or a memory 1256 associated with a processor and the processor 1258 is coupled 2030 to the destination node 102 (FIG. 1) of a network 12. Coupling 2030 enables the executable updating instructions from step 2026 to receive and process counter data 32 received at the destination node 102 from all other nodes 13 (FIG. 1) of the network 12. In step 2040, the processor is coupled to a source of PUIs to be disambiguated. In most embodiments, step 2040 will be identical with step 2050. In some embodiments, however, steps 2040 and 2050 may be separate. For example, the processor may be coupled to a routine operable to produce all PUIs in rapid sequence, and the IVHM receives only telemetry that has been disambiguated. Process 2000 ends at step 2062.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for making an apparatus for disambiguating telemetry, wherein said telemetry includes data sent by exception over a multi-path, multi-tier communications network having a plurality of telemetry source nodes producing telemetry data elements, a plurality of linked relay nodes, and one destination node, each said telemetry source node connected to at least one relay node, and further wherein each node originates uniquely identifiable counter data over said network, wherein counter data is a periodically changing data stream, the method comprising the steps of:

obtaining a network diagram of said multi-path, multi-tier communications network;

organizing data describing said network diagram, wherein said data describing said network diagram includes data relating to said counter data; and autocoding said data describing said network diagram to produce a telemetry disambiguating computer program, wherein the autocoding includes:

producing a computer program executable to disambiguate telemetry sent by exception over the multi-path, multi-tier communications network responsive to the data describing said network diagram;

producing a data structure retaining data relating to designed paths through said diagrammed network responsive to the data describing said network diagram;

producing a computer program for updating said data structure with data relating to counter data from said diagrammed network said data relating to counter data associated with said designed paths, wherein said computer program to disambiguate telemetry is responsive to counter data from said diagrammed network to disambiguate telemetry data by searching said designed oaths for at least one possible path having data associated with said counter data and indicating if at least one possible path is an operable path, and wherein a machine readable media bears the autocoder.

2. The method of claim 1, further comprising the step of executing said telemetry disambiguating computer program on a processor coupled to a source of said counter data previously received by said destination node, said processor further coupled to a source of process unique identifiers (PUIs) wherein said process unique identifiers are related to each of the telemetry source nodes.

3. The method of claim 1, wherein the step of obtaining said network diagram comprises the steps of:

drawing at least one relay node icon having a first shape, said relay node icon having associated text data relating to counter data originating from said at least one relay node;

drawing at least one telemetry source node icon having a second shape having associated text data relating to telemetry originating from said at least one telemetry source node;

drawing a plurality of link icons having a third shape, each said link icon connecting two node icons.

4. The method of claim 1, wherein the step of autocoding further comprises using said network diagram to define an organizational scheme for a data structure in said telemetry disambiguating computer program.

5. The method of claim 1, wherein the step of autocoding said telemetry disambiguating computer program comprises the step of storing data in said data structure, said data including data relating to said telemetry, data relating to designed paths through said network, and said data relating to said counter data.

6. The method of claim 5, wherein the step of storing data in said data structure comprises storing said data in said data structure having a structure derived from said data describing said network diagram.

7. The method of claim 5, wherein the step of storing said data in said data structure comprises storing a PUI table having each PUI associated with said each node further associated with a group including all said PUIs commonly originating from said each node, each said PUI associated with a group index to a record in a group table.

8. The method of claim 7, further comprising the step of storing said group table, wherein each said group is associated with particular first and last path indexes to a range of entries in a path table, wherein each said path index relates to a particular path between each said group and said destination node.

9. The method of claim 8, further comprising the step of storing a group status indicator in at least one record of said group table.

10. The method of claim 8, further comprising the step of storing said path table, wherein each said path is associated with particular first and last link indexes to a range of entries in a link table, said path table comprising ordered sequences of path records, wherein each said ordered sequence of path records has a range bounded by a first path and a last path for said particular group.

11. The method of claim 10, further comprising the step of storing a path status indicator in at least one record of said path table.

12. The method of claim 10, further comprising the step of storing a link table having ordered sequences of links, wherein each ordered sequence is to a range of indexes bounded by a first link index and a last link index for said particular path, each ordered sequence of links forming said particular path from said particular group to said destination node.

13. The method of claim 12, further comprising the step of storing a pipe table having an ordered sequence of pipe data lists, each pipe data list having a unique identifier for each counter associated with an indicator of node operability for said node originating said counter data.

14. The method of claim 13, comprising the step of storing a primary/secondary status indicator and a primary/secondary enumeration value in said pipe table.

15. The method of claim 13, wherein the step of storing said tables comprises the step of creating directly addressable data structures.

16. The method of claim 5, wherein the step of producing said telemetry disambiguating computer program further comprises the step of autocoding an updating function executable to produce an indicator of node operability from said counter data and to associate said indicator with said in data relating to designed paths in said data structure.

17. A method of creating a telemetry disambiguation program from data describing a network diagram of a multi-path, multi-tiered network transmitting telemetry by exception, tile network diagram comprising an ordered arrangement of nodal icons having associated text data and connected by link icons having a source end and a destination end, the method comprising the steps of:
1) producing computer program to disambiguate telemetry sent by exception over the multi-path, multi-tier communications network responsive to data describing the network diagram, wherein the produced computer program to disambiguate telemetry is capable of performing the following functions:
a) finding designed paths through said diagrammed network from each node, further comprising the steps of:
b) storing in said data structure a text string relating to a counter associated with each nodal icon; and
c) storing in said data structure pipe status indicators associated with each said counter, said designed paths having associated data relating to said counter data indicating if said designed path is an operable path;
2) producing a data structure retaining data relating to the found designed paths through said diagrammed network based on the stored data structures;
3) producing a computer program for updating said data structure with data relating to counter data from said diagrammed network responsive to said network diagram data; said data relating to counter data associated with said designed paths.

18. The method of claim 17, wherein the step of finding designed paths further comprises the steps of:
Sorting icons into nodal icons and link icons;
Recursively finding each designed path to said destination node by, for each nodal icon, finding each link icon having said source end connected to said each nodal icon;
For each link icon having said source end connected to said each nodal icon, finding each nodal icon connected to said destination end of said each link icon;
Storing in a data structure sequences of found links relating to each designed path.

19. The method of claim 18, wherein the step of finding designed paths further comprises the steps of collecting said icons and mid associated data; and
determining the type of each icon.

20. The method of claim 18, wherein the step of sorting icons includes storing data related to each link icon in association with a unique source node icon identifier and a unique destination node identifier for that link.

21. The method of claim 18, wherein the step of storing icons includes storing data related to each nodal icon in association with text data associated with that nodal icon.

22. The method of claim 17, wherein the step of storing in said data structure a text string further comprises the steps of:
creating a plurality of indexed tables to hold data;
and for each nodal icon:
getting a group table index for a group table of said plurality of indexed tables; and
storing data relating to each PUI associated with said nodal icon in a PUI table of said plurality of indexed tables, wherein each said PUI is associated with said group table index.

23. The method of claim 22, further comprising the steps of, for each path:
getting a path table index for a path table of said plurality of indexed tables; and
storing data relating to said path associated with said nodal icon in said path table.

24. The method of claim 23, further comprising the steps of, for each link:
getting a link table index for a link table of said plurality of indexed tables; and
storing data relating to each link associated with said path of said nodal icon in said link table;
getting a pipe table index for a pipe table of said plurality of indexed tables; and
storing data related to a counter PUI in association with a pipe status indicator in said pipe table.

25. The method of claim 17, further comprising the steps of storing to a file predetermined code for:
searching said data structure for all possible paths for a particular element of said telemetry;
identifying all nodes in each of said possible paths; and
determining if there exists at least the path among said all possible paths having said pipe status indicators indicating node operability for said all nodes in said at least one path; and
compiling together said data structure and said predetermined code.

26. The method of claim 25, further comprising the step of writing to a file predetermined code for updating said pipe status indicators based upon counter data.

27. An apparatus for disambiguating telemetry transmitted by exception over a multi-path, multi-tier, multi-node network to a destination node, the apparatus comprising:
A processor coupled to said destination node;
A memory coupled to said processor;
Code in said memory executable to translate data representing a network into a data structure retaining data representing designed paths through said network associated with status indicators for each node in each said designed path;
Code in said memory executable to produce in said memory code for searching said data structure to find at least one possible path among said designed paths; and
Code in said memory executable to produce code executable to update said data in said data structure based upon data received at said destination node,
wherein said data received at said destination node comprises counter data, wherein the codes are operable as a unit to disambiguate telemetry sent by exception over a multi-tier, multi-path network, and wherein a machine readable medium bears the code.

28. The apparatus of claim 27, further comprising a source of telemetry data element names coupled to said processor.

29. The Apparatus of claim 28, wherein said code for searching said data structure is responsive to reception of each telemetry data element name to disambiguate said named telemetry data based upon said updated data in said data structure.

30. The apparatus of claim 29, further comprising an integrated vehicle health management system (IVHMS) coupled to said processor, said IVHMS responsive to disambiguated telemetry data to change a state vector of said vehicle.

31. A computer program product comprising a storage medium having program instructions embodied thereon that, when executed, are operable to cause an autocoder responsive to network diagram data to:

produce a computer program executable to disambiguate telemetry sent by exception over a multi-tier, multi-path network, wherein said autocoder is responsive to said network diagram data to produce a data structure retaining data relating to designed paths through said diagrammed network, wherein said autocoder is further responsive to said network diagram data to produce a computer program for updating said data structure with data relating to counter data from said diagrammed network, said data relating to counter data associated with said designed paths, and wherein said computer program executable to search said designed paths for at least one possible path having said associated data relating to said counter data indicating that said at least one possible path is an operable path, wherein said operable path comprises a particular possible path for which counter data is being received from each node in said possible path.

* * * * *